US009307547B2

(12) United States Patent
Nogami et al.

(10) Patent No.: US 9,307,547 B2
(45) Date of Patent: Apr. 5, 2016

(54) TERMINAL APPARATUS, BASE STATION APPARATUS, COMMUNICATION SYSTEM, AND COMMUNICATION METHOD

(75) Inventors: Toshizo Nogami, Osaka (JP); Kazuyuki Shimezawa, Osaka (JP); Kimihiko Imamura, Osaka (JP); Katsunari Uemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 208 days.

(21) Appl. No.: 14/009,851

(22) PCT Filed: Apr. 3, 2012

(86) PCT No.: PCT/JP2012/059047
§ 371 (c)(1),
(2), (4) Date: Oct. 4, 2013

(87) PCT Pub. No.: WO2012/137764
PCT Pub. Date: Oct. 11, 2012

(65) Prior Publication Data
US 2014/0044109 A1 Feb. 13, 2014

(30) Foreign Application Priority Data
Apr. 5, 2011 (JP) ................................. 2011-083402

(51) Int. Cl.
*H04W 4/00* (2009.01)
*H04W 72/08* (2009.01)
(Continued)

(52) U.S. Cl.
CPC ............. *H04W 72/085* (2013.01); *H04L 1/003* (2013.01); *H04L 1/0026* (2013.01); *H04L 1/0031* (2013.01); *H04W 24/10* (2013.01); *H04L 5/0057* (2013.01)

(58) Field of Classification Search
CPC .... H04L 5/0057; H04L 5/0055; H04L 1/0026
USPC ......................................... 370/329, 252, 328
See application file for complete search history.

(56) References Cited

U.S. PATENT DOCUMENTS

2010/0118817 A1* 5/2010 Damnjanovic et al. ....... 370/329
2010/0260060 A1* 10/2010 Abraham et al. ............. 370/252
(Continued)

FOREIGN PATENT DOCUMENTS

JP   2011-004212 A   1/2011
JP   2011-055273 A   3/2011
WO   2010/056763 A2  5/2010

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification ( Release 10)," Dec. 2010, 3 GPP TS 36.331, V10.0.0, 276 pages.
(Continued)

*Primary Examiner* — Dang Ton
*Assistant Examiner* — Sai Aung
(74) *Attorney, Agent, or Firm* — Keating & Bennett, LLP

(57) ABSTRACT

Provided is a terminal apparatus which performs communication with a base station apparatus. The terminal apparatus includes: a receiving unit which receives a plurality of channel state information reference signals; a channel state information generating unit which generates a plurality of channel state information by referring to each of the plurality of channel state information reference signals; and a report transmitting unit which reports each of the plurality of channel state information to the base station apparatus.

4 Claims, 21 Drawing Sheets

(51) Int. Cl.
*H04W 24/10* (2009.01)
*H04L 1/00* (2006.01)
*H04L 5/00* (2006.01)

(56) References Cited

U.S. PATENT DOCUMENTS

| | | | |
|---|---|---|---|
| 2010/0322176 A1* | 12/2010 | Chen et al. | 370/329 |
| 2010/0329195 A1* | 12/2010 | Abraham et al. | 370/329 |
| 2010/0329236 A1* | 12/2010 | Sampath et al. | 370/350 |
| 2011/0053647 A1 | 3/2011 | Oyama | |
| 2011/0090880 A1* | 4/2011 | Abraham et al. | 370/338 |
| 2012/0088458 A1 | 4/2012 | Nogami et al. | |
| 2013/0044685 A1* | 2/2013 | Fong et al. | 370/328 |

OTHER PUBLICATIONS

Official Communication issued in International Patent Application No. PCT/JP2012/059047, mailed on Jun. 19, 2012.

3GPP TS 36.213 V10.0.1, "3rd Generation Partnership Project; Technical Specification Group Radio Access Network; Evolved Universal Terrestrial Radio Access (E-UTRA); Physical layer procedures (Release 10)", Dec. 2010, 98 pages.

3GPP TS 36.211 V10.0.0, "3rd Generation Partnership Project; Technical Specification Group Radio Access Network; Evolved Universal Terrestrial Radio Access (E-UTRA); Physical channels and modulation (Release 10)", Dec. 2010; 103 pages.

\* cited by examiner

TERMINAL APPARATUS, BASE STATION APPARATUS, COMMUNICATION SYSTEM, AND COMMUNICATION METHOD

TECHNICAL FIELD

The present invention relates to a terminal apparatus, a base station apparatus, a communication system, and a communication method.

BACKGROUND ART

In a mobile radio communication system such as WCDMA (Wideband Code Division Multiple Access), LTE (Long Term Evolution), and LTE-A (LTE-Advanced) by 3GPP (Third Generation Partnership Project), and WiMAX (Worldwide Interoperability for Microwave Access), a base station apparatus (base station, transmitter station, downlink transmitting apparatus, uplink receiving apparatus, or eNodeB) or a transmitter station based on the base station apparatus has a cellular configuration of disposing a plurality of areas to be covered in a cell shape, so as to enlarge the communication area. By using different frequencies between adjacent cells or sectors, communication can be performed without interference of transmission signals from a plurality of base station apparatuses, even with a terminal apparatus (mobile station apparatus, receiver station, uplink transmitting apparatus, downlink receiving apparatus, mobile terminal, or UE (User Equipment)) in a cell edge region or a sector edge region. However, there is a problem of low frequency utilization efficiency. On the other hand, by using the same frequencies between the adjacent cells or sectors, the frequency utilization efficiency can be improved. However, it is necessary to provide a countermeasure to interference with respect to the terminal apparatus in the cell edge region.

In addition, by adaptively controlling modulation and coding scheme (hereinafter, also referred to as "MCS"), number of spatial multiplex (number of layers, ranks), precoder, or the like, according to the transmission line state between the base station apparatus and the terminal apparatus, it is possible to even more efficiently realize data transmission. NPL 1 and NPL 2 disclose a method of performing the control described above.

FIG. 21 is a diagram showing a base station apparatus 2101 and a terminal apparatus 2102 of the LTE system. In the LTE system, in a case of adaptively controlling the MCS, the number of spatial multiplexes, or the precoder with respect to a downlink transmission signal 2103 transmitted with a downlink, the terminal apparatus 2102 computes reception quality information (or also referred to as channel state information (CSI)) 2104 and reports the information to the base station apparatus 2101 through an uplink channel. In more detail, by referring to a downlink reference signal (DLRS) included in the downlink transmission signal 2103 which is transmitted from the base station apparatus 2101, the terminal apparatus 2102 computes a rank indicator (RI) which indicates preferred number of spatial multiplexes, a precoding matrix indicator (PMI) which indicates a preferred precoder, or a channel quality indicator (CQI) which indicates a preferred transmission rate, as the reception quality information 2104, and reports the information to the base station apparatus 2101.

CITATION LIST

Patent Literature

NPL 1: 3rd Generation Partnership Project; Technical Specification Group Radio Access Network; Evolved Universal Terrestrial Radio Access (E-UTRA); Physical layer procedures (Release 10), December, 2010, 3GPP TS36.213, V10.0.1 (2010-12)

NPL 2: 3rd Generation Partnership Project; Technical Specification Group Radio Access Network; Evolved Universal Terrestrial Radio Access (E-UTRA); Radio Resource Control (RRC); Protocol specification (Release10), December, 2010, 3GPP TS36.331, V10.0.0 (2010-12)

SUMMARY OF INVENTION

Technical Problem

In the communication system of the related art, one kind of reference signal for channel state information measurement is used, and in a case of transmitting reception quality information, the process with respect to the reception quality information was performed only in one way regardless of the state thereof, and accordingly this caused disturbance of improvement of transmission efficiency.

The present invention has been made to address the aforementioned problems and an object thereof is to provide a terminal apparatus which can efficiently report reception quality information in a case of transmitting the reception quality information, a base station apparatus, a communication system, and a communication method.

Solution to Problem

According to an aspect of the present invention, there is provided a terminal apparatus which performs communication with a base station apparatus. The terminal apparatus includes: a receiving unit which receives a plurality of channel state information reference signals; a channel state information generating unit which generates a plurality of channel state information items by referring to each of the plurality of channel state information reference signals; and a report transmitting unit which reports each of the plurality of channel state information reference signals to the base station apparatus.

The report transmitting unit preferably reports each of the plurality of channel state information items to the base station apparatus at individually set timing.

The channel state information generating unit preferably generates a plurality of channel state information items according to individually set report modes, by referring to each of the plurality of channel state information reference signals.

Preferably, the channel state information generating unit extracts at least one reference signal for channel state information measurement which is indicated by the base station apparatus, among the plurality of channel state information reference signals, and generates channel state information by referring to the extracted reference signal for channel state information measurement, and the report transmitting unit reports the plurality of channel state information items to the base station apparatus at the same timing.

Each of the plurality of channel state information reference signals is preferably generated using a sequence generated based on a physical cell identifier which can be individually set.

According to another aspect of the present invention, there is provided a base station apparatus which performs communication with a terminal apparatus. The base station apparatus includes: a notification unit which notifies setting information items for each of a plurality of channel state information reference signals to the terminal apparatus; and a report receiving unit which receives a plurality of channel state information items which are generated by referring to each of the plurality of channel state information reference signals.

Each of the setting information items for each of the plurality of channel state information reference signals preferably includes information indicating individual timing.

Each of the setting information items for each of the plurality of channel state information reference signals preferably includes information indicating individual report mode.

The notification unit preferably notifies reference signal setting information for channel state information measurement for indicating at least one reference signal for channel state information measurement, among the plurality of channel state information reference signals.

At least one setting information item among the setting information items for each of the plurality of channel state information reference signals preferably includes information indicating individual physical cell identifier.

According to still another aspect of the present invention, there is provided a communication system which performs communication between a base station apparatus and a terminal apparatus. The base station apparatus includes: a notification unit which notifies setting information items for each of a plurality of channel state information reference signals to the terminal apparatus, and a report receiving unit which receives a plurality of channel state information items which are generated by referring to each of the plurality of channel state information reference signals. The terminal apparatus includes a receiving unit which receives a plurality of channel state information reference signals, a channel state information generating unit which generates a plurality of channel state information items by referring to each of the plurality of channel state information reference signals, and a report transmitting unit which reports each of the plurality of channel state information reference signals to the base station apparatus.

According to still another aspect of the present invention, there is provided a communication method of a terminal apparatus which performs communication with a base station apparatus. The communication method includes: a step of receiving a plurality of channel state information reference signals; a step of generating a plurality of channel state information items by referring to each of the plurality of channel state information reference signals; and a step of reporting each of the plurality of channel state information items to the base station apparatus.

According to still another aspect of the present invention, there is provided a communication method of a base station apparatus which performs communication with a terminal apparatus. The communication method includes: a step of notifying setting information items for each of a plurality of channel state information reference signals to the terminal apparatus; and a step of receiving a plurality of channel state information items which are generated by referring to each of the plurality of channel state information reference signals.

Advantageous Effects of Invention

According to the present invention, it is possible to perform efficient reporting of the reception quality information, in a case of transmitting the reception quality information.

DESCRIPTION OF EMBODIMENTS

<First Embodiment>

Hereinafter, a first embodiment of the present invention will be described with reference to the drawings.

Figure 1:
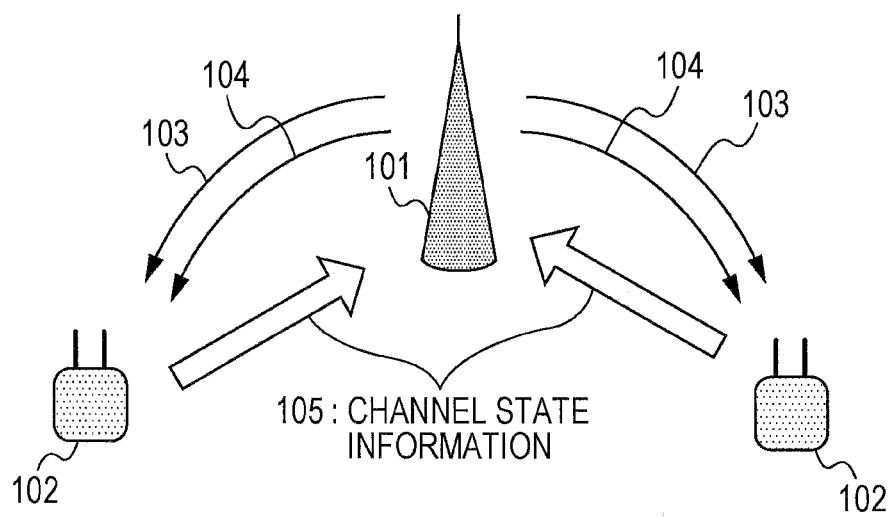
FIG. 1 is a schematic configuration diagram showing a configuration of a communication system according to a first embodiment of the present invention.

FIG. 1 is a schematic configuration diagram showing a configuration of a communication system according to the first embodiment of the present invention. The communication system of the drawing is assumed to be an LTE-A system, and includes a base station apparatus (base station, transmitter station, downlink transmitting apparatus, uplink receiving apparatus, or eNodeB) 101 which configures cells, and a terminal apparatus (mobile station apparatus, mobile station, receiver station, uplink transmitting apparatus, downlink receiving apparatus, mobile terminal, or UE (User Equipment)) 102. In a case of adaptively controlling a transmission parameter such as a modulation and coding scheme (MCS), rank, a precoder, or the like, with respect to downlink transmission signals which are transmitted from the base station apparatus 101, the terminal apparatus 102 computes reception quality information (or also referred to as channel state information (CSI)) 105 and reports the information to the base station apparatus 101 through an uplink channel. In more detail, by referring to downlink reference signals (hereinafter, also referred to as a "downlink reference signal DLR" or a "downlink reference signal DLRS") 103 and 104 included in the downlink transmission signal which is transmitted from the base station apparatus 101, the terminal apparatus 102 computes a rank indicator (RI) which indicates preferred number of spatial multiplexes, a plurality of partial precoder information (PI) which indicates a preferred precoder, or a channel quality indicator (CQI) which indicates a preferred transmission rate (modulation and coding scheme, length of transport block), as reception quality information.

Figure 2:
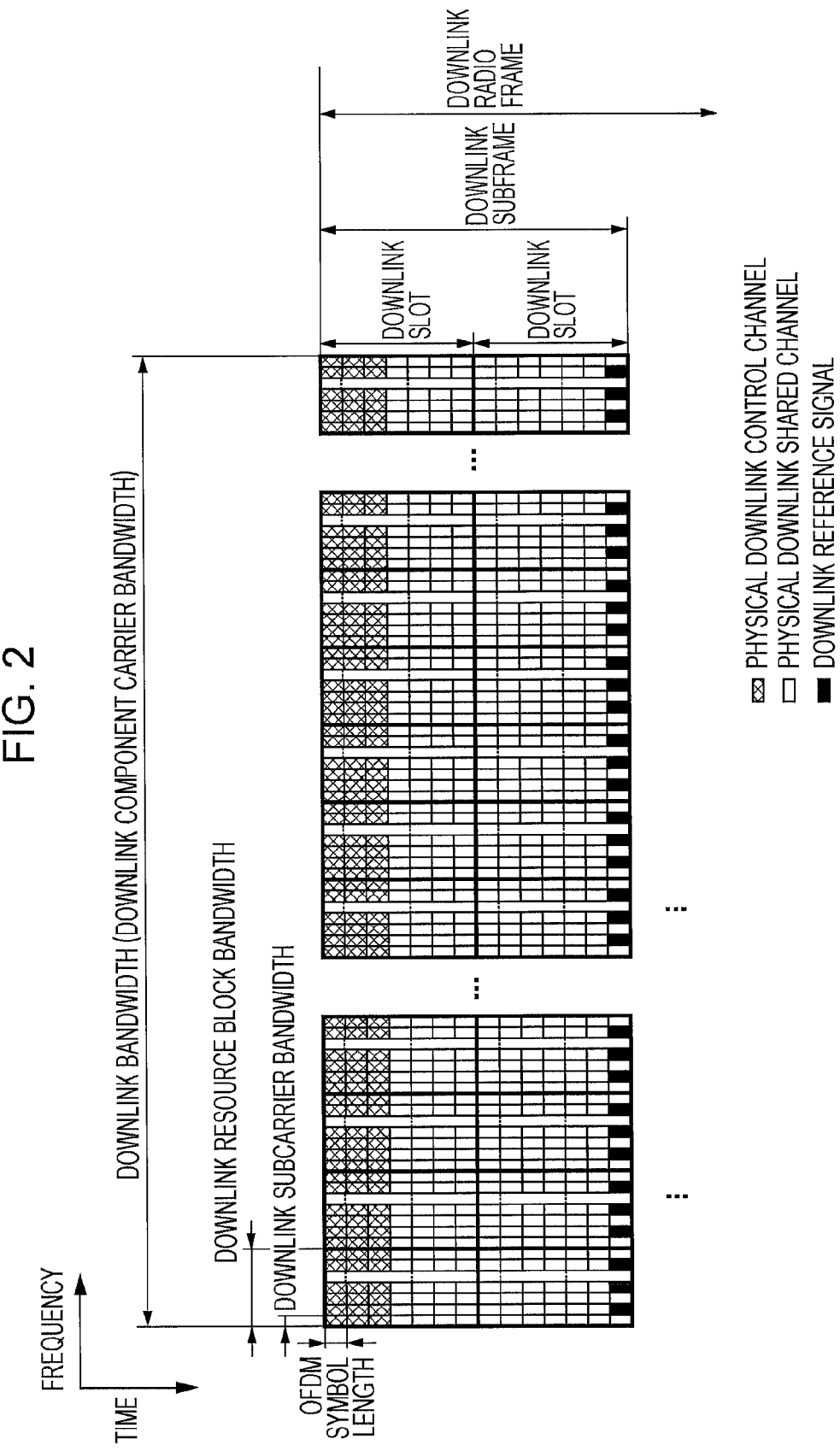
FIG. 2 is a diagram showing one example of a downlink radio frame configuration of a first embodiment.

FIG. 2 shows an example of a downlink radio frame configuration according to the embodiment. For the downlink, an orthogonal frequency division multiplex (OFDM) access scheme is used. A physical downlink control channel (PDSCH), a physical downlink shared channel (PDSCH), and the like are allocated to the downlink. In addition, the downlink reference signal DLRS is multiplexed on a part of the PDSCH. A downlink radio frame comprises downlink resource block (RB) pairs. This downlink RB pair is a unit of allocation of downlink radio resources, and is formed of a frequency band (RB bandwidth) of a predetermined bandwidth and a time duration (two slots=1 subframe). One downlink RB pair comprises two contiguous downlink RBs (RB bandwidth×slot) in a time domain. One downlink RB comprises twelve subcarriers in a frequency domain and comprises seven OFDM symbols in the time domain. A region regulated by one subcarrier in the frequency domain and one OFDM symbol in the time domain is referred to as a resource element (RE). A physical downlink control channel is a physical channel through which downlink control information such as a terminal apparatus identifier, scheduling information of a physical downlink shared channel, scheduling information of a physical uplink shared channel, modulation scheme, coding scheme, or a retransmission parameter is transmitted. Herein, a downlink subframe of one component carrier (CC) is disclosed, however, the downlink subframe is regulated for each CC and the downlink subframe is substantially synchronized between CCs.

Figure 3:
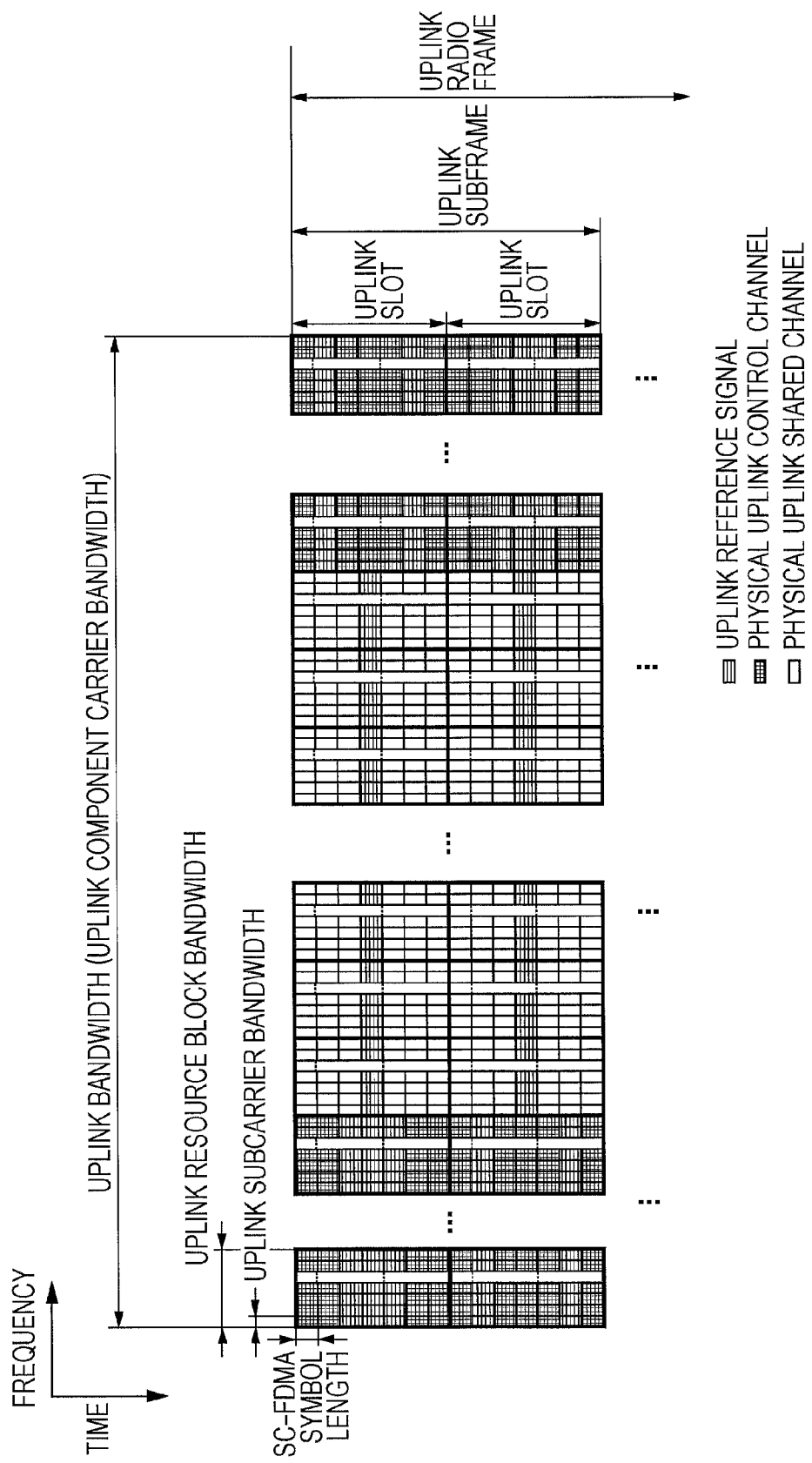
FIG. 3 is a diagram showing one example of an uplink radio frame configuration of a first embodiment.

FIG. 3 shows an example of an uplink radio frame configuration according to the embodiment. A single carrier-frequency division multiple access (SC-FDMA) scheme is used for the uplink. A physical uplink shared channel (PUSCH), a physical uplink control channel (PUCCH), and the like are allocated to the uplink. In addition, an uplink reference signal is allocated to a part of the PUSCH and/or the PUCCH. The uplink radio frame comprises uplink RB pairs. This uplink RB pair is a unit of allocation of uplink radio resources, and is formed of a frequency band (RB bandwidth) of a predetermined bandwidth and a time duration (two slots=1 subframe). One uplink RB pair comprises two contiguous uplink RBs (RB bandwidth×slot) in the time domain. One uplink RB comprises twelve subcarriers in the frequency domain and comprises seven SC-FDMA symbols in the time domain. Herein, an uplink subframe of one CC is disclosed, however, the uplink subframe is regulated for each CC.

Herein, carrier aggregation will be described. The carrier aggregation is a technology of aggregating a plurality of different frequency bands (component carriers) to handle those as one frequency band. For example, in a case of aggregating five component carriers having a frequency bandwidth of 20 MHz by the carrier aggregation, the terminal apparatus can perform access by regarding the frequency band thereof as a frequency bandwidth of 100 MHz. In addition, the component carriers to be aggregated may be continuous frequency bands, or may be completely or partially discontinuous frequency bands. For example, in a case where the usable frequency bands are a band of 800 MHz, a band of 2.4 GHz, and a band of 3.4 GHz, one component carrier, another component carrier, and still another component carrier may be transmitted in a band of 800 MHz, a band of 2 GHz, and a band of 3.4 GHz, respectively.

In addition, continuous or discontinuous component carriers in the same frequency band, for example, in a band of 2.4 GHz, can be aggregated. The frequency bandwidths of each component carrier may be a frequency bandwidth which is narrower than 20 MHz, or may be different frequency bandwidths from each other. Based on various factors such as retained amount of data buffer, the report of the reception quality of the terminal apparatus, load and QoS in the cell, the base station apparatus can increase or decrease the number of the component carriers of the uplink and/or downlink to be allocated to the terminal apparatus. In addition, the number of the uplink component carriers which are allocated by the base station apparatus is desirably the same as or smaller than the number of the downlink component carriers. The base station apparatus configures one cell by a combination of one downlink component carrier and one uplink component carrier.

The correspondence between the uplink and the downlink frequencies may be explicitly indicated as frequency information in broadcast information. Alternatively, in a case of not being explicitly indicated, the correspondence thereof may be implicitly indicated, by using information of specified frequency differences between the uplink and the downlink uniquely determined for each operation frequency. Not limiting to the methods, the indication may be performed using the other methods, as long as it is possible to show correspondence between the uplink and the downlink frequencies for each cell.

Figure 4:
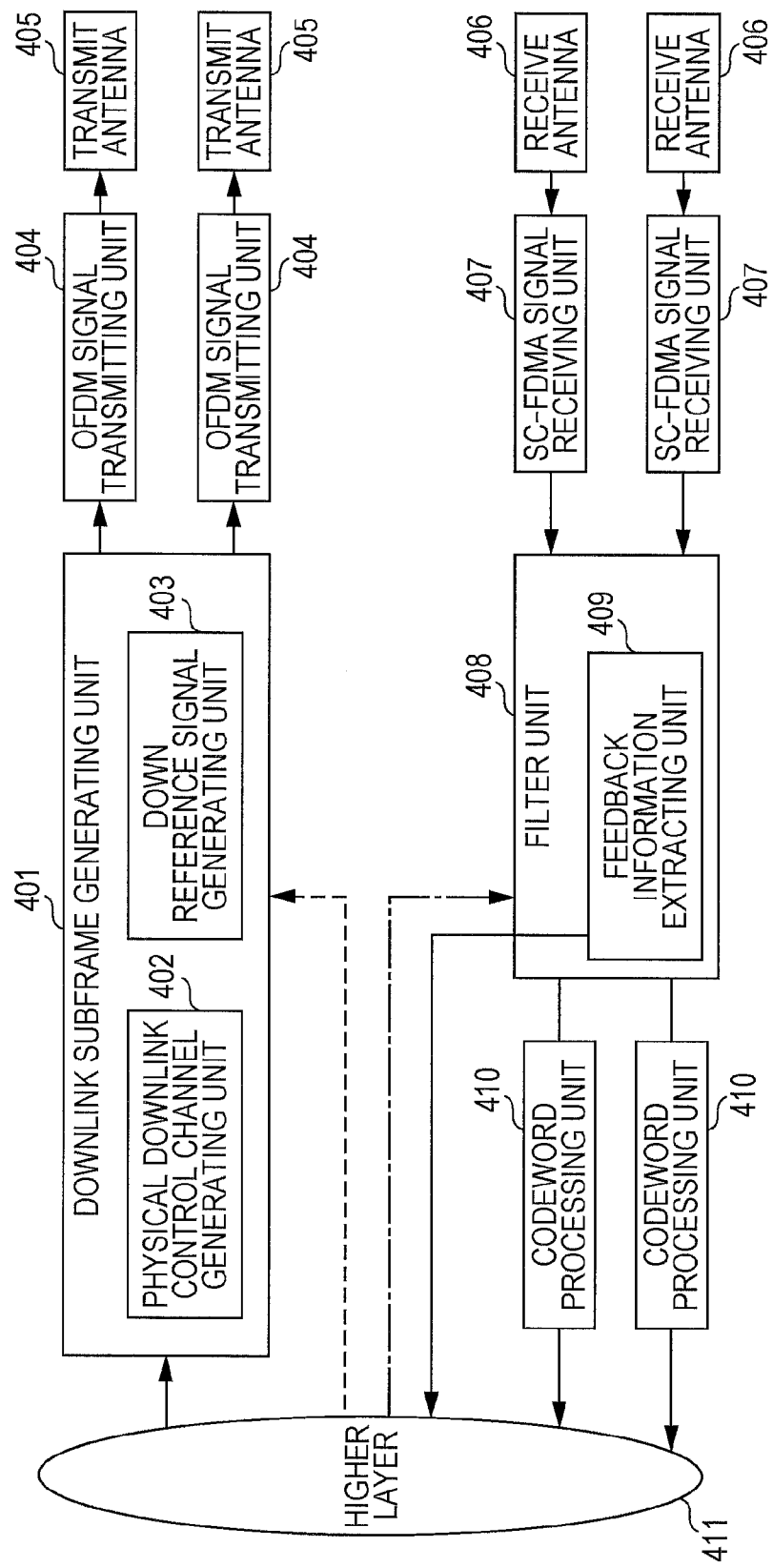
FIG. 4 is a block diagram showing one configuration example of a base station apparatus of a first embodiment.

FIG. 4 is a block diagram showing a configuration example of the base station apparatus according to the embodiment. The base station apparatus includes a downlink subframe generating unit 401, an OFDM signal transmitting unit (notification unit) 404, a transmit antenna (base station apparatus transmit antenna) 405, a receive antenna (base station apparatus receive antenna) 406, an SC-FDMA signal receiving unit (report receiving unit) 407, a filter unit 408, a codeword processing unit 410, and an higher layer 411. The downlink subframe generating unit 401 includes a physical downlink control channel generating unit 402 and a downlink reference signal generating unit 403. The filter unit 408 includes a feedback information extracting unit 409.

Figure 5:
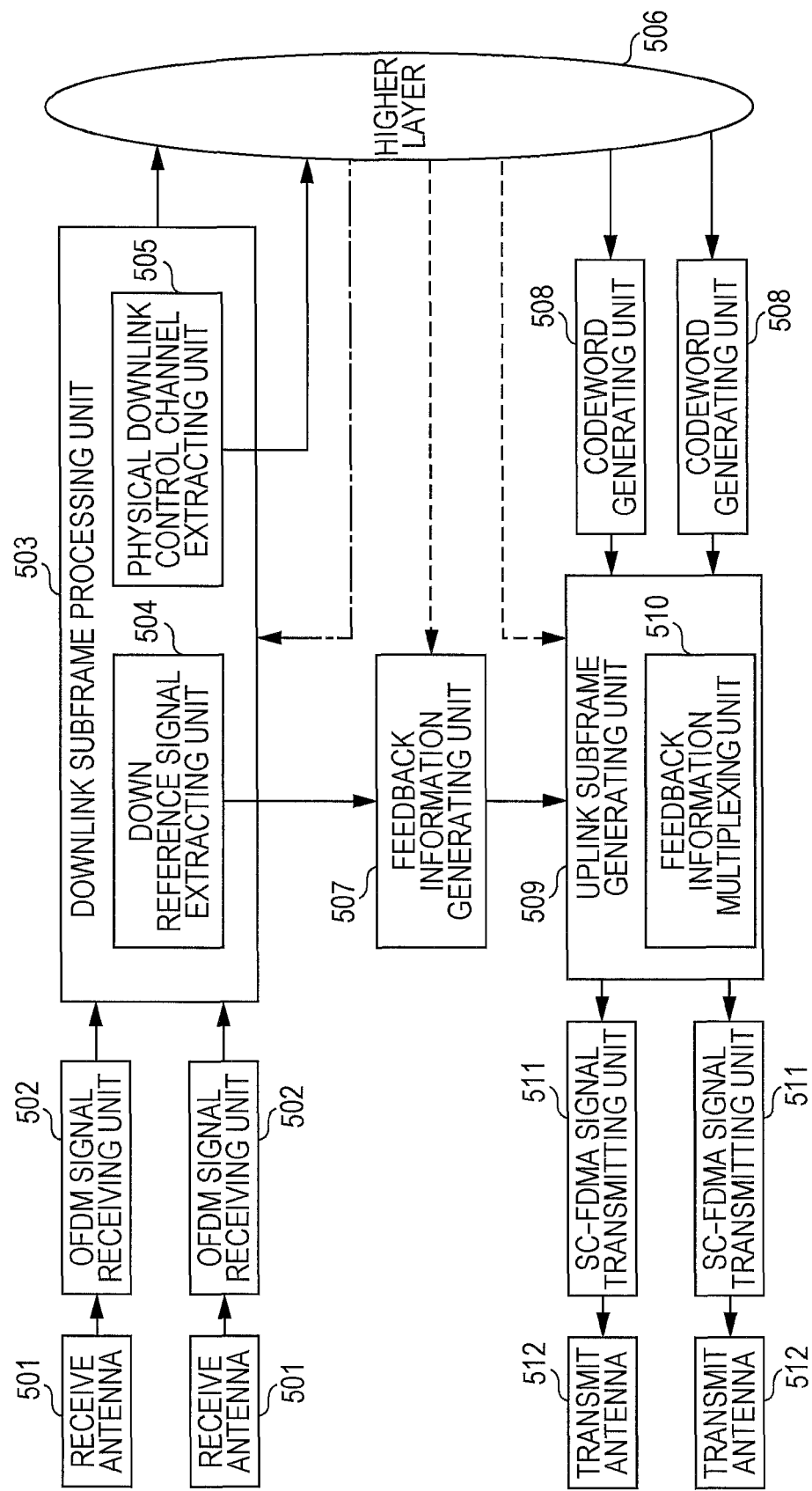
FIG. 5 is a block diagram showing one configuration example of a terminal apparatus of a first embodiment.

FIG. 5 is a block diagram showing a configuration example of the terminal apparatus according to the embodiment. The terminal apparatus includes a receive antenna (terminal apparatus receive antenna) 501, an OFDM signal receiving unit (receiving unit) 502, a downlink subframe processing unit 503, an higher layer 506, a feedback information generating unit (channel state information generating unit) 507, a codeword generating unit 508, an uplink subframe generating unit 509, an SC-FDMA signal transmitting unit (report transmitting unit) 511, and a transmit antenna (terminal apparatus transmit antenna) 512. The downlink subframe processing unit 503 includes a downlink reference signal extracting unit 504 and a physical downlink control channel extracting unit

505. The uplink subframe generating unit 509 includes a feedback information multiplexing unit 510.

First, flow of transmission and reception of the downlink will be described with reference to FIGS. 4 and 5. In the base station apparatus, transmission data (also referred to as a "transport block") for each codeword (transmission data sequence of a physical layer) which is sent from the higher layer 411, is converted into a modulated symbol sequence in the downlink subframe generating unit 401, by error correcting coding, rate matching process, and modulation processes such as phase shift keying (PSK), or quadrature amplitude modulation (QAM). The modulated symbol sequence is mapped with the resource elements (REs) which are unit for mapping of the modulated symbol sequence, and is subject to a precoding process by a precoder indicated by the higher layer 411. In addition, the RE of the downlink is regulated corresponding to each subcarrier on each OFDM symbol. At that time, the transmission data sequence which is sent from the higher layer 411 includes control data for radio resource control (RRC) signaling. In addition, the physical downlink control channel generating unit 402 generates a physical downlink control channel under the instruction of the higher layer 411. Herein, the control information included in the physical downlink control channel includes information such as a transmission parameter of the downlink, resource allocation of the uplink, a transmission parameter of the uplink, or CQI request. The downlink reference signal generating unit 403 generates the downlink reference signal (DLRS). The downlink subframe generating unit 401 maps the physical downlink control channel and the DLRS to the RE in the downlink subframe. The downlink subframe generated in the downlink subframe generating unit 401 is modulated to the OFDM signal in the OFDM signal transmitting unit 404 and is transmitted through the transmit antenna 405.

In the terminal apparatus, the OFDM signal receiving unit 502 receives the OFDM signal through the receive antenna 501, and an OFDM demodulation process is performed. The downlink subframe processing unit 503 extracts the reception data from the received downlink subframe and sends the data to the higher layer 506. In more detail, the downlink subframe processing unit 503 executes a demodulation process, a rate matching process, and error correcting decoding which correspond to the modulation process, the rate matching process, and the error correcting coding of the downlink subframe generating unit 401. The downlink reference signal extracting unit 504 extracts the DLRS which is generated in the downlink reference signal generating unit 403 and mapped in the downlink subframe generating unit 401, and sends the DLRS to the feedback information generating unit 507. The physical downlink control channel extracting unit 505 extracts control information included in the physical downlink control channel which is generated in the physical downlink control channel generating unit 402 and mapped in the downlink subframe generating unit 401, and sends the control information to the higher layer 506.

Herein, the processes of the downlink subframe generating unit 401, the OFDM signal transmitting unit 404, and the transmit antenna 405 in the base station apparatus, and the processes of the receive antenna 501, the OFDM signal receiving unit 502, and the downlink subframe processing unit 503 in the terminal apparatus are performed for each cell (CC) of the downlink. In addition, the feedback information generating unit 507 generates the reception quality information (also referred to as "feedback information" or "channel state information (CSI)") of the plurality of downlink cells.

Next, flow of transmission and reception of the uplink will be described with reference to FIGS. 4 and 5. In the terminal apparatus, transmission data (also referred to as a "transport block") for each codeword which is transmitted from the higher layer 506, is converted into a code word (CW), by processes such as error correcting coding or rate matching process, in the codeword generating unit 508. The feedback information generating unit 507 generates feedback information by coding the RI, PMI, CQI, and the like using the DLRS which is extracted in the downlink reference signal extracting unit 504, according to the instruction of the higher layer 506. The uplink subframe generating unit 509 sorts the code word modulated symbol sequence and the feedback information by a predetermined method, and then maps to the uplink subframe. Particularly, the feedback information multiplexing unit 510 multiplexes the feedback information to the uplink subframe. The SC-FDMA signal transmitting unit 511 generates an SC-FDMA signal by performing SC-FDMA modulation to the uplink subframe, and transmits the SC-FDMA signal through the transmit antenna 512.

In the base station apparatus, the SC-FDMA signal receiving unit 407 receives the SC-FDMA signal through the receive antenna 406, and an SC-FDMA demodulation process is performed. The filter unit 408 extracts the code word from the received uplink subframe to send the code word to the codeword processing unit 410. The codeword processing unit 410 extracts reception data from the code word to send the reception data to the higher layer 411. In more detail, the codeword processing unit 410 extracts the reception data by performing the rate matching process and the error correcting decoding which correspond to the rate matching process and the error correcting coding of the codeword generating unit 508. The feedback information extracting unit 409 in the filter unit 408 extracts and decodes the feedback information which is generated in the feedback information generating unit 507 and mapped in the downlink subframe generating unit 401 according to the instruction of the higher layer 411, and sends the feedback information to the higher layer 411. Herein, in a filtering process performed by the filter unit 408, a signal for each code word is detected using a method such as zero forcing (ZF), minimum mean square error (MMSE), or maximum likelihood detection (MLD), with respect to the reception signal for each receive antenna 406.

Figure 6:
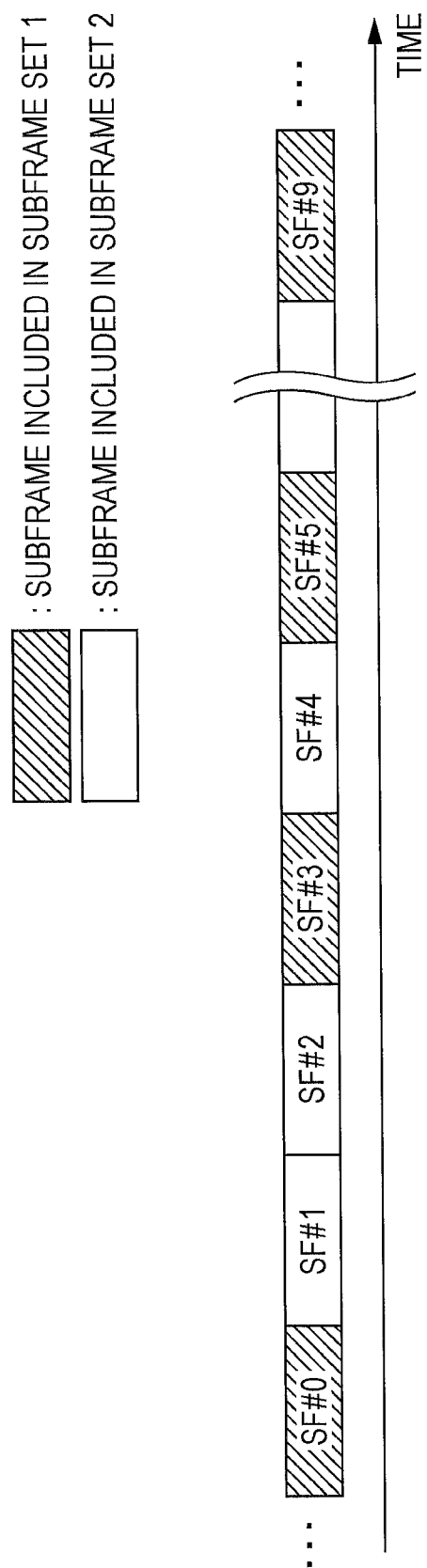
FIG. 6 is a diagram showing a configuration example of a subframe set of a first embodiment.

FIG. 6 is a diagram showing a configuration example of a subframe set (also referred to as a subframe group or an average group). The subframe set is a set of the plurality of subframes. FIG. 6 shows a case where two subframe sets of a subframe set 1 and a subframe set 2 are configured. In this example, the subframe set 1 includes subframes SF#0, SF#3, SF#6, and SF#9, and the subframe set 2 includes subframes SF#1, SF#2, and SF#4. The subframes included in each subframe set are indicated using a bit map method of 40 bits assuming that 40 subframes are set to 1 cycle. The terminal apparatus averages noise or interference signal power of each subframe, and computes the CSI of each subframe set, using the averaged noise or interference signal power. In addition, the subframe set is not always configured. In the terminal apparatus in which the subframe set is not configured, the averaging process of the noise or the interference signal power is performed without limitation of the subframes.

Figure 7:
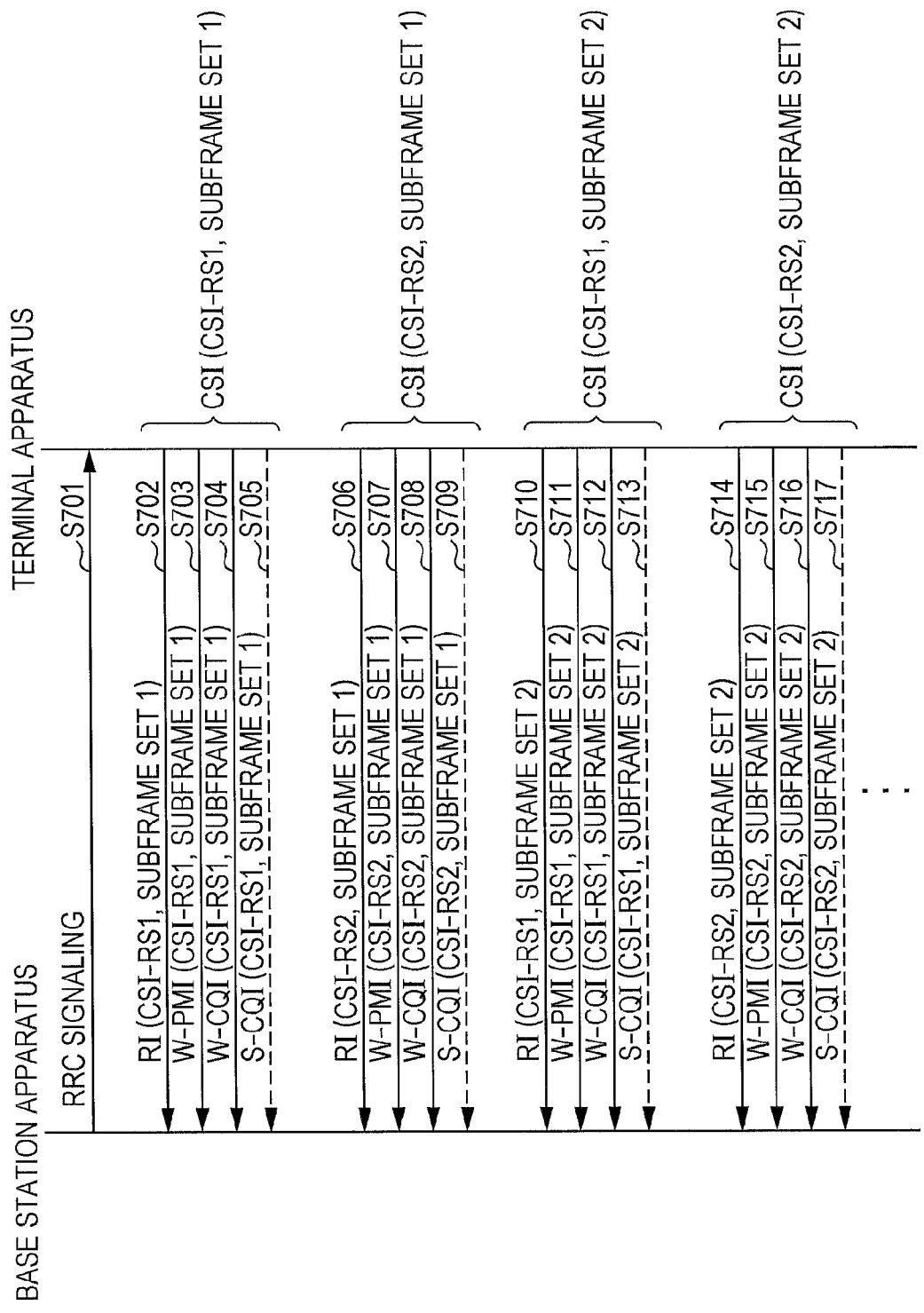
FIG. 7 is a diagram showing an example of a procedure of periodic CSI feedback of a first embodiment.

FIG. 7 shows an example of a procedure of periodic CSI feedback according to the embodiment. The procedure in FIG. 7 is an example of a procedure for periodic feedback of the RI, the W-PMI, the CQI (Wideband-CQI (W-CQI), Sub-band-CQI (S-CQI)). In addition, the W-CQI is one CQI for representing the system bandwidth (component carrier bandwidth). The S-CQI is one CQI for representing the subbands, each of which is a band obtained by dividing the system bandwidth (component carrier bandwidth) into a plurality of bands. In addition, the feedback mode (also referred to as "reporting mode") herein includes configuration of combination of content of the reception quality information for feeding back from the terminal apparatus to the base station apparatus, a measuring or generating method of each content, a feedback method of each content, or resources used in the feedback. When broadly classifying the feedback mode, it is classified into periodic feedback for reporting the CSI through the PUCCH and aperiodic feedback for reporting the CSI through the PUSCH.

First, through the RRC signaling, the base station apparatus configures the parameter of the feedback of the terminal apparatus and indicates the periodic feedback (Step S701). As the parameter, the periodic feedback mode is configured with respect to each combination of the plurality of DLRSs and the plurality of subframe sets. The configuration of the periodic feedback mode includes, at least, configuration of a period and an offset. Herein, as the DLRSs, two DLRSs of the CSI-RS1 and CSI-RS2 are assumed, and as the subframe sets, two subframe sets of the subframe set 1 and the subframe set 2 are assumed. Herein, the period is a period of the subframe, and corresponds to a period for feeding back each content included in the CSI. In addition, the offset is an offset of the subframe, and corresponds to an offset for shifting the timing for feeding back each content included in the CSI. The period and the offset may be separately configured with respect to each content, or may be implicitly associated between the content. For example, the periods and offsets of the RI and the W-CQI are separately configured, and the timing for reporting the W-PMI and S-CQI can be calculated from the period and the offset of the W-CQI.

The terminal apparatus which the periodic feedback is indicated performs periodic CSI feedback described below, with respect to each combination of the plurality of DLRSs and the plurality of subframe sets.

(1) The RI (Step S702), the W-PMI (Step S703), W-CQI (Step S704), and S-CQI (Step S705) are periodically reported to the base station apparatus, according to feedback parameters configured for the CSI-RS1 and the subframe set 1.

(2) The RI (Step S706), the W-PMI (Step S707), W-CQI (Step S708), and S-CQI (Step S709) are periodically reported to the base station apparatus, according to feedback parameters configured for the CSI-RS2 and the subframe set 1.

(3) The RI (Step S710), the W-PMI (Step S711), W-CQI (Step S712), and S-CQI (Step S713) are periodically reported to the base station apparatus, according to feedback parameters configured for the CSI-RS1 and the subframe set 2.

(4) The RI (Step S714), the W-PMI (Step S715), W-CQI (Step S716), and S-CQI (Step S717) are periodically reported to the base station apparatus, according to feedback parameters configured for the CSI-RS2 and the subframe set 2.

Figure 8:
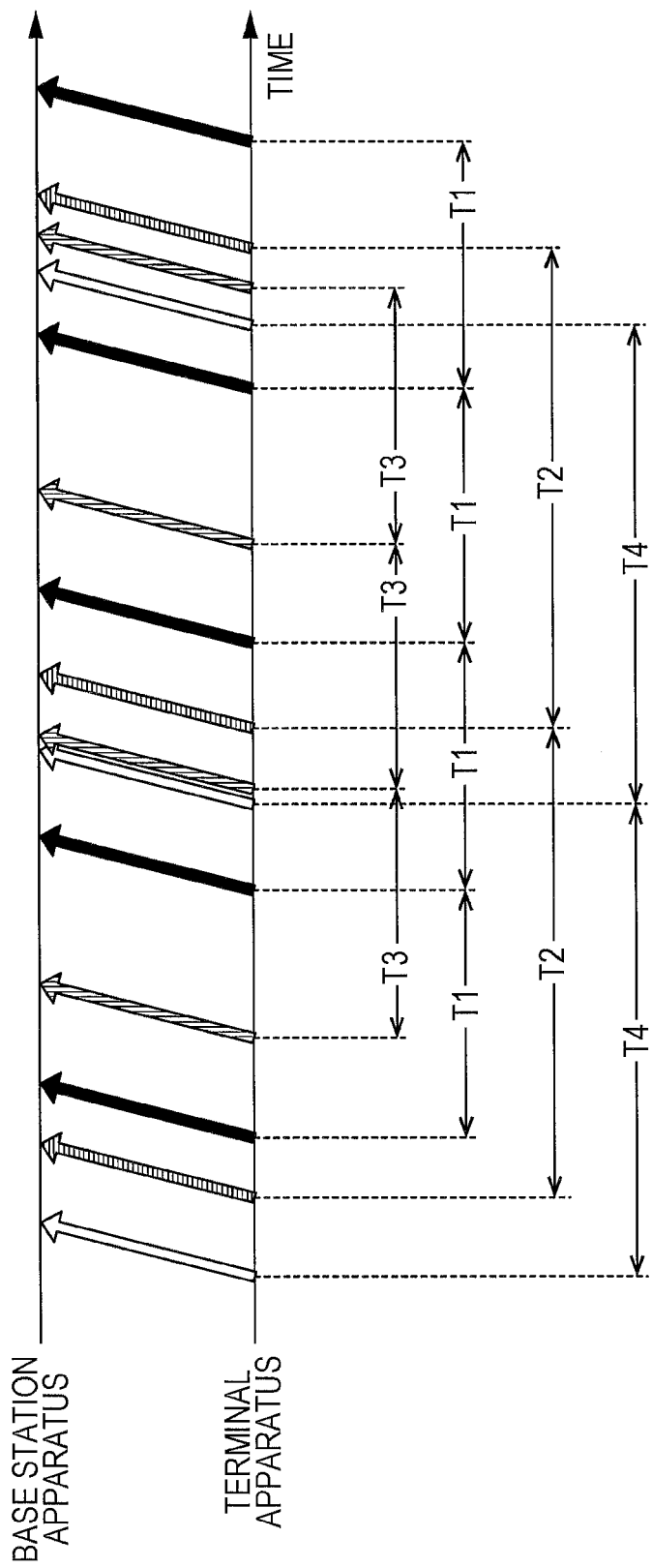
FIG. 8 is a diagram showing an example of timing of periodic feedback of a first embodiment.

FIG. 8 shows an example of timing of the periodic feedback according to the embodiment. The CSI with respect to the CSI-RS1 and the subframe set 1 is fed back in a period T1, the CSI with respect to the CSI-RS2 and the subframe set 1 is fed back in a period T2, the CSI with respect to the CSI-RS1 and the subframe set 2 is fed back in a period T3, and the CSI with respect to the CSI-RS2 and the subframe set 2 is fed back in a period T4. All of the offsets thereof are different from each other. In all combinations herein, examples of reporting the RI, W-PMI, W-CQI, and S-CQI are shown, however it is not limited thereto. By including the combination of reported content in the configuration of the periodic feedback mode, it is possible to configure to not report a part of the content, for example, to not report RI and/or CQI in the arbitrary combination. Reversely, the other content thereof can be reported.

Figure 9:
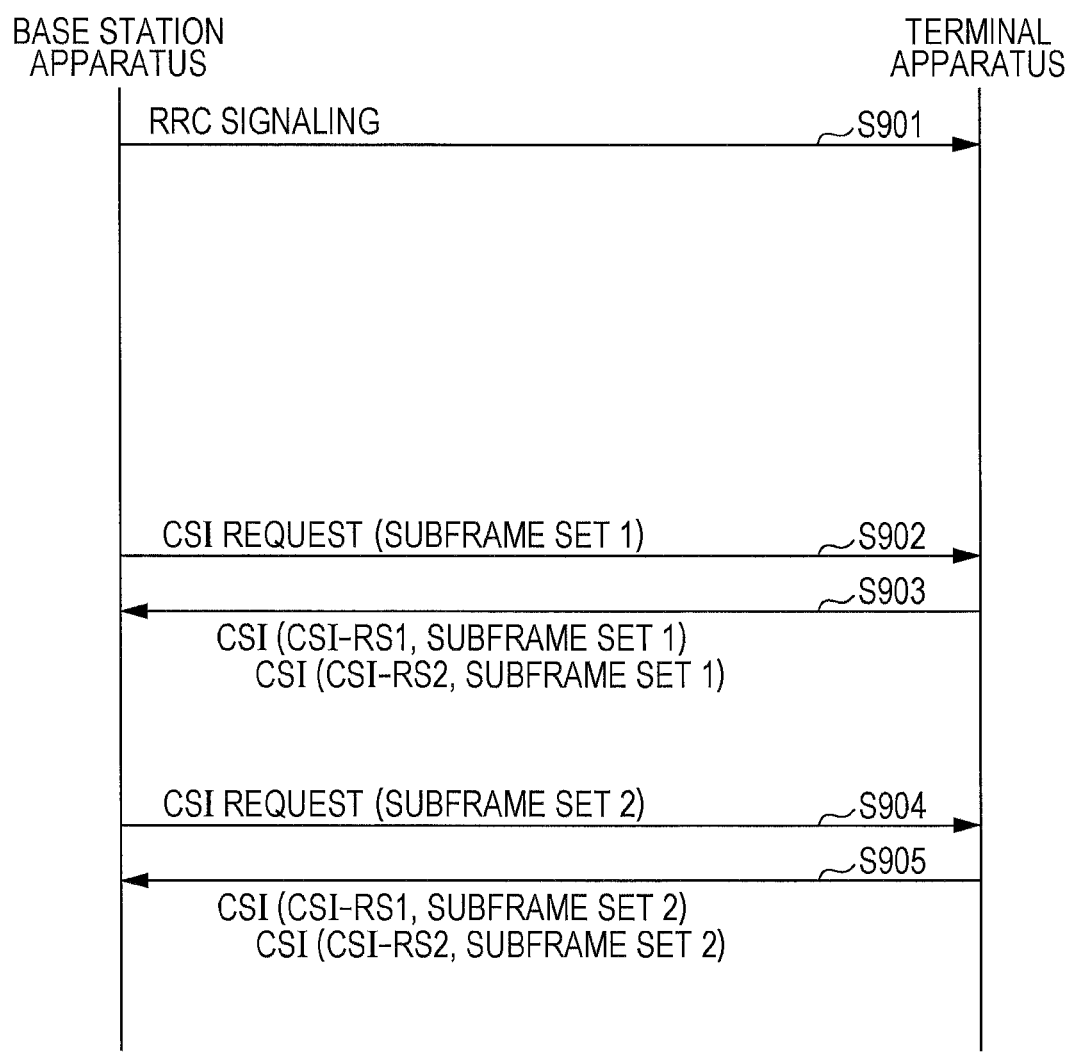
FIG. 9 is a diagram showing an example of a procedure for aperiodically performing feedback of CSI of a first embodiment.

FIG. 9 shows an example of a procedure for aperiodically performing feedback of CSI according to the embodiment. First, the base station apparatus configures parameters of the feedback of the terminal apparatus through the RRC signaling (Step S901). The parameters can include combination (reference signal setting information for channel state information measurement) of the DLRSs for reporting the CSI. That is, it is possible to use a parameter for indicating which DLRS is referred to when calculating the CSI aperiodically reported. For example, in a case where the n (n is a natural number) kinds of CSI-RS1 are configured, the parameter can be expressed by bit map with n bits. In addition, as the parameter, the aperiodic feedback mode can be configured with respect to each combination of the plurality of DLRSs and the plurality of subframe sets. The aperiodic feedback mode is regulated by the combination of the content to be reported.

Next, the base station apparatus notifies a CSI request which is information for indicating the aperiodic feedback to the terminal apparatus (Step S902). In addition, the base station apparatus allocates resources (for example, a physical uplink shared channel) for simultaneously reporting the feedback information. Herein, in a case where the subframe set is configured, the subframe for transmitting the CSI request is a subframe included in any of the subframe sets. Herein, it is assumed the subframe for transmitting the CSI request is included in the subframe set 1. The terminal apparatus which is indicated the aperiodic feedback reports the CSI of each DLRS to the base station apparatus simultaneously (at the same timing), according to the feedback parameters (combination of DLRSs) configured in the Step S901 (Step S903). In FIG. 9, since the example in which the combination of the CSI-RS1 and the CSI-RS2 is configured is shown, the terminal apparatus reports the CSI calculated by referring to the CSI-RS1 and the CSI calculated by referring to the CSI-RS2. In addition, as Step S902, in a case where the CSI request is notified in the subframe included in the subframe set 1, the terminal apparatus calculates the CSI using an average value of the noise or the interference signal power of subframe set 1. Each of the CSI calculated by referring each CSI-RS can include the content regulated by the aperiodic feedback mode which is individually configured, with respect to each combination of the plurality of DLRSs and the plurality of subframe sets.

Herein, the example in which the notification of the CQI request to the terminal apparatus in Step S902 is performed with a dynamic signaling through the physical downlink control channel, is shown, however, it is not limited thereto. For example, the same effects can be obtained if the indication of the aperiodic feedback is performed by semi-static signaling through the RRC signaling. In this case, it is preferable to further indicate the subframe for reporting.

In a case where the base station apparatus notifies the CSI request to the terminal apparatus using the subframe included in the subframe set 2 (Step S904), the terminal apparatus which is indicated the aperiodic feedback reports the CSI of each DLRS to the base station apparatus simultaneously (at the same timing) according to the feedback parameters (combination of DLRSs) configured in Step S901 (Step S905). In FIG. 9, since the example in which the combination of the CSI-RS1 and the CSI-RS2 is configured is shown, the terminal apparatus reports the CSI calculated by referring to the CSI-RS1 and the CSI calculated by referring to the CSI-RS2. In addition, as Step S902, in a case where the CSI request is notified in the subframe included in the subframe set 2, the terminal apparatus calculates the CSI using an average value of the noise or the interference signal power of subframe set 2. Each of the CSI calculated by referring to each CSI-RS can include the content regulated by the aperiodic feedback mode which is individually configured, with respect to each combination of the plurality of DLRSs and the plurality of subframe sets.

Herein, the case where the combination of the DLRSs is commonly configured for the subframe sets, has been described, however, it is not limited thereto. The combination of DLRSs can be individually configured for each subframe set.

In addition, the case where the subframe sets are configured has been described, however, it is not limited thereto. In a case where the subframe sets are not configured, instead of the combinations of the plurality of DLRSs and the plurality of subframe sets, the aperiodic feedback mode may be configured with respect to each of the plurality of DLRSs.

Figure 10:
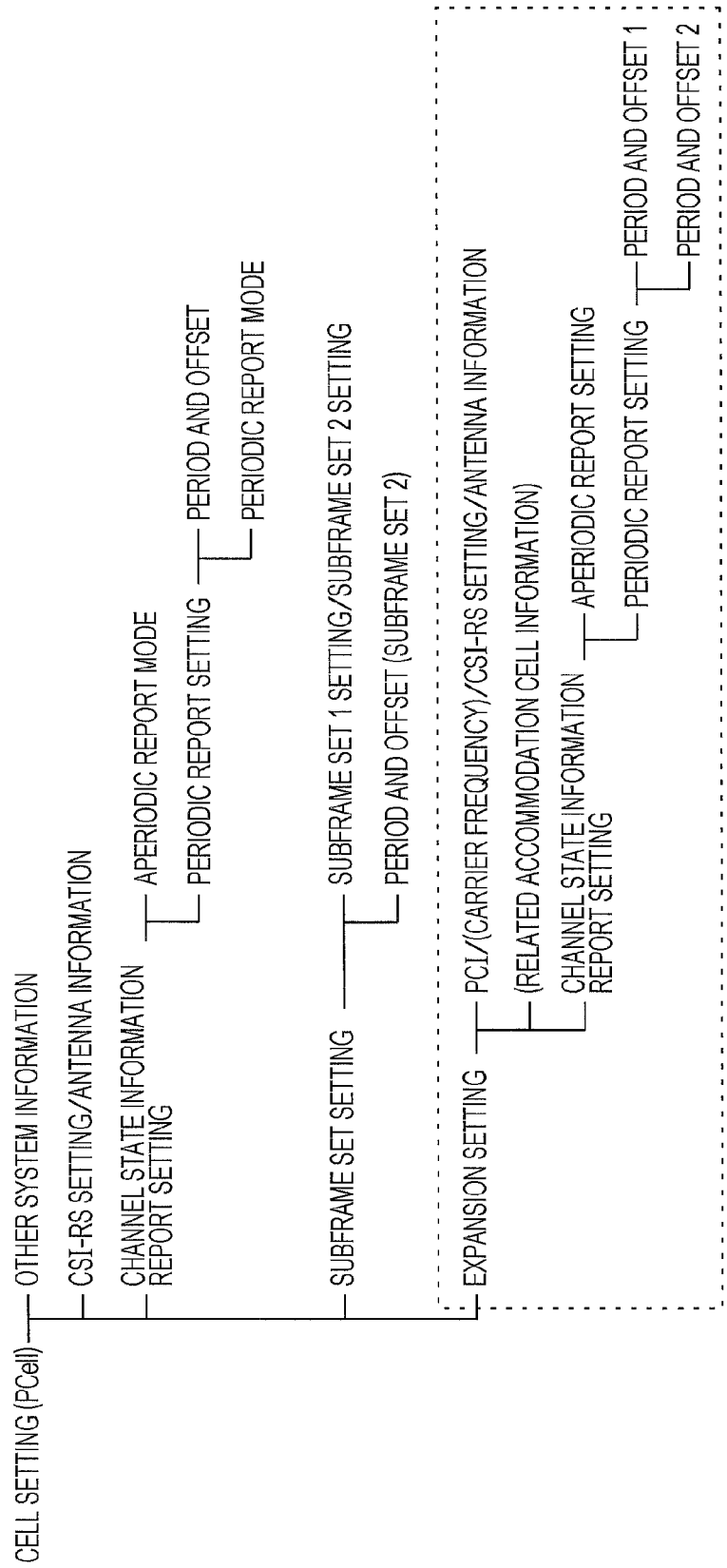
FIG. 10 is a diagram showing an example of a structure of an information element of RRC signaling of a first embodiment.

FIG. 10 is an example of a structure of an information element of the RRC signaling. Configuration of PCell (primary cell) which is a main serving cell includes each element of various system information, first CSI-RS configuration, antenna information, and configuration of channel state information report. Further, in a case where the subframe sets are configured, the configuration of the PCell includes each element of the subframe set configuration. Herein, the element of the CSI-RS configuration includes information for indicating the number of ports of the CSI-RS and information for indicating the subframe where the CSI-RS is located. In more detail, the element of the CSI-RS configuration includes information for indicating the period and the offset of the subframe where the CSI-RS is located and/or a resource element where the CSI-RS is mapped in the subframe. The element of the configuration of the channel state information report includes an element of the aperiodic reporting mode and an element of the periodic report configuration, and in addition, the element of the periodic report configuration includes an element of the period and the offset, and the element of the periodic reporting mode. The period and the offset is applied to the feedback in a case where the subframe sets are not configured, or to the periodic feedback related to the subframe set 1 in a case where the subframe sets are configured. In addition, the subframe set configuration includes the elements of the subframe set 1 configuration and the subframe set 2 configuration, and elements of the period and the offset of the periodic feedback of the subframe set 2. Hereinabove elements are the information elements which are common with the information elements in the system for feedback of the CSI related to one CSI-RS.

The information element of the system for feedback of the CSI related to the plurality of CSI-RSs additionally includes information elements for extended configuration. The extended configuration includes CSI-RS configuration related to second and subsequent CSI-RSs, antenna information, an element including physical cell identity (PCI) used for generating a sequence used in the CSI-RS, an element of information for indicating a carrier frequency, or an element of information for indicating a related serving cell accommodation cell (related accommodation cell), and an element of configuration of channel state information report. Herein, the carrier frequency is information for indicating downlink CC. The related serving cell is any of PCell or SCell (secondary cell) which is a secondary serving cell, and corresponds to an serving cell having CC of the same frequency as the CC for transmitting the CSI-RS which is configured by the extended configuration by the base station apparatus. Herein, the CSI-RS configuration is information related to second and subsequent CSI-RSs and includes information for indicating the subframe where the CSI-RSs are located. Alternatively, the CSI-RS configuration may include information related to the other CSI-RS. For example, information indicating a power ratio of the CSI-RSs and the data symbol or the number of ports of the CSI-RS can be included in the CSI-RS configuration.

The elements of the configuration of the channel state information report includes an element of aperiodic report configuration which is configuration of the aperiodic CSI feedback related to second and subsequent CSI-RSs, and an element of periodic report configuration which is configuration of the periodic CSI feedback related to the second and subsequent CST-RSs. In addition, the element of periodic report configuration includes an element of the period and the offset (period and offset 1) indicating timing of the periodic feedback of the subframe set 1 in a case where the subframe sets are configured or in a case where the subframe sets are not configured, and an element of the period and the offset (period and offset 2) indicating timing of the periodic feedback of the subframe set 2 in a case where the subframe sets are configured.

Using such information elements, the parameter configuration through the RRC signaling of Step S701 in FIG. 7 and Step S901 in FIG. 9 can be realized. The signaling is performed between the higher layer 411 and the higher layer 506. In addition, under the instruction of the higher layer 506, the feedback information generating unit 507 generates each CSI at designated timing, and the uplink subframe generating unit 509 performs a multiplexing process at designated timing. On the other hand, the feedback information extracting unit 409 of the filter unit 408 in the base station apparatus acquires each CSI at designated timing, under the instruction of the higher layer 411.

As described above, the base station apparatus notifies the configuration information of each of the plurality of channel state information reference signals to the terminal apparatus, and receives the plurality of channel state information generated by referring to each of the plurality of channel state information reference signals. In addition, each of the plurality of channel state information reference signals includes each individual timing and/or report mode. Alternatively, in addition to the configuration information described above, channel state information reference signal configuration for indicating at least one channel state information reference signal among the plurality of channel state information reference signals is included.

In addition, the terminal apparatus configures the configuration information described above which is notified from the base station apparatus, receives the plurality of channel state information reference signals, generates the plurality of channel state information by referring to each of the plurality of channel state information reference signals, and reports each of the plurality of channel state information to the base station apparatus. Herein, the terminal apparatus reports each of the plurality of channel state information to the base station apparatus at individually configured timing. Alternatively, the terminal apparatus refers each of the plurality of channel state information reference signals, and generates the plurality of channel state information according to the individually configured report mode. Alternatively, in addition to the configuration information described above, in a case where the channel state information reference signal configuration is configured, the terminal apparatus extracts at least one indicated channel state information reference signal, generates channel state information by referring to the extracted channel state information reference signal, and reports the channel state information to the base station apparatus at the same timing as the plurality of channel state information.

That is to say, the base station apparatus notifies the plurality of CSI-RS configurations to the terminal apparatus, and the terminal apparatus performs the feedback of the CSI which is calculated by referring to each CSI-RS. At that time, each CSI-RS configuration includes information indicating individual CSI-RS position (for example, period and offset). In addition, the base station apparatus individually configures the following items (1) to (3), with respect to each CSI calculated by referring to each CSI-RS.

(1) Aperiodic Report Mode
(2) Periodic Report Mode
(3) Feedback Period and Offset of Periodic Report Feedback (Period and Offset of Periodic Report Feedback for Each Subframe Set in Case Where Subframe Set is Configured)

In a case of performing the aperiodic feedback, the base station apparatus previously notifies the combination of the CSI-RS(s) for reporting the CSI by the aperiodic feedback, among the plurality of CSI-RSs to the terminal apparatus.

Accordingly, it is possible to improve a degree of freedom of the CSI feedback parameter configuration (feedback timing, content for feedback, referred subframe set, or the like) with respect to the plurality of CSI-RSs having different parameter configuration (transmission period, transmission power, the number of ports, or the like), and therefore it is possible to perform the efficient report of reception quality information.

<Second Embodiment>

In the first embodiment, the configuration in that the CSI corresponding to the second and subsequent CSI-RSs is calculated in both subframe sets in a case where the subframe sets are configured, has been described. In contrast, in a second embodiment, a configuration in that the CSI corresponding to the second and subsequent CSI-RSs is calculated in the first subframe set in a case where the subframe sets are configured, will be described. Hereinafter, the second embodiment of the present invention will be described with reference to FIGS. 11 to 13. In addition, the base station apparatus and the terminal apparatus according to the embodiment can be realized with the same configuration as the configuration examples shown in FIG. 4 and FIG. 5, and thus the detailed descriptions thereof are not repeated.

Figure 11:
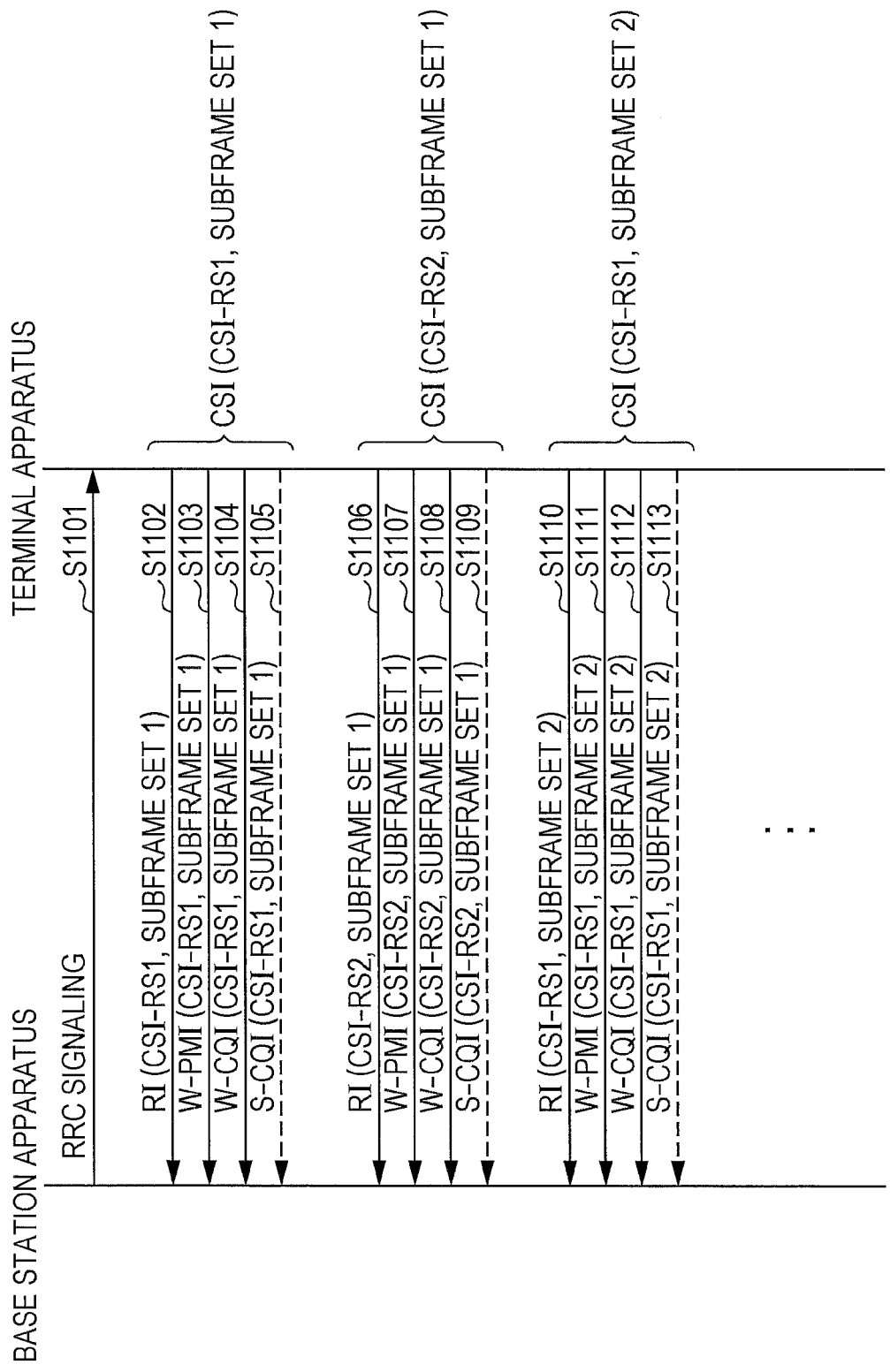
FIG. 11 is a diagram showing an example of a procedure of periodic CSI feedback according to a second embodiment of the present invention.

FIG. 11 shows an example of a procedure of the periodic CSI feedback according to the embodiment. The procedure shown in FIG. 11 is an example of a procedure of periodic feedback of the CSI.

First, through the RRC signaling, the base station apparatus configures the parameter of the feedback of the terminal apparatus and indicates the periodic feedback (Step S1101). As the parameter, the periodic feedback mode is configured with respect to each combination of the plurality of DLRSs and the plurality of subframe sets. The configuration of the periodic feedback mode includes, at least, configuration of a period and an offset. Herein, as the DLRSs, two DLRSs of the CSI-RS1 and CSI-RS2 are assumed, and as the subframe sets, two subframe sets of the subframe set 1 and the subframe set 2 are assumed. Herein, the period is a period of the subframe, and corresponds to a period for feeding back each content included in the CSI. In addition, the offset is an offset of the subframe, and corresponds to an offset for shifting the timing for feeding back each content included in the CSI. The period and the offset may be separately configured with respect to each content, or may be implicitly associated between the content. For example, the periods and offsets of the RI and the W-CQI are separately configured, and the timing for reporting the W-PMI and S-CQI can be calculated from the period and the offset of the W-CQI.

The terminal apparatus which indicates the periodic feedback performs periodic CSI feedback described below, with respect to each combination of the plurality of DLRSs and the subframe set 1.

(1) The RI (Step S1102), the W-PMI (Step S1103), W-CQI (Step S1104), and S-CQI (Step S1105) are periodically reported to the base station apparatus, according to feedback parameters configured in the CSI-RS1 and the subframe set 1.

(2) The RI (Step S1106), the W-PMI (Step S1107), W-CQI (Step S1108), and S-CQI (Step S1109) are periodically reported to the base station apparatus, according to feedback parameters configured in the CSI-RS2 and the subframe set 1.

(3) The RI (Step S1110), the W-PMI (Step S1111), W-CQI (Step S1112), and S-CQI (Step S1113) are periodically reported to the base station apparatus, according to feedback parameters configured in the CSI-RS1 and the subframe set 2.

Figure 12:
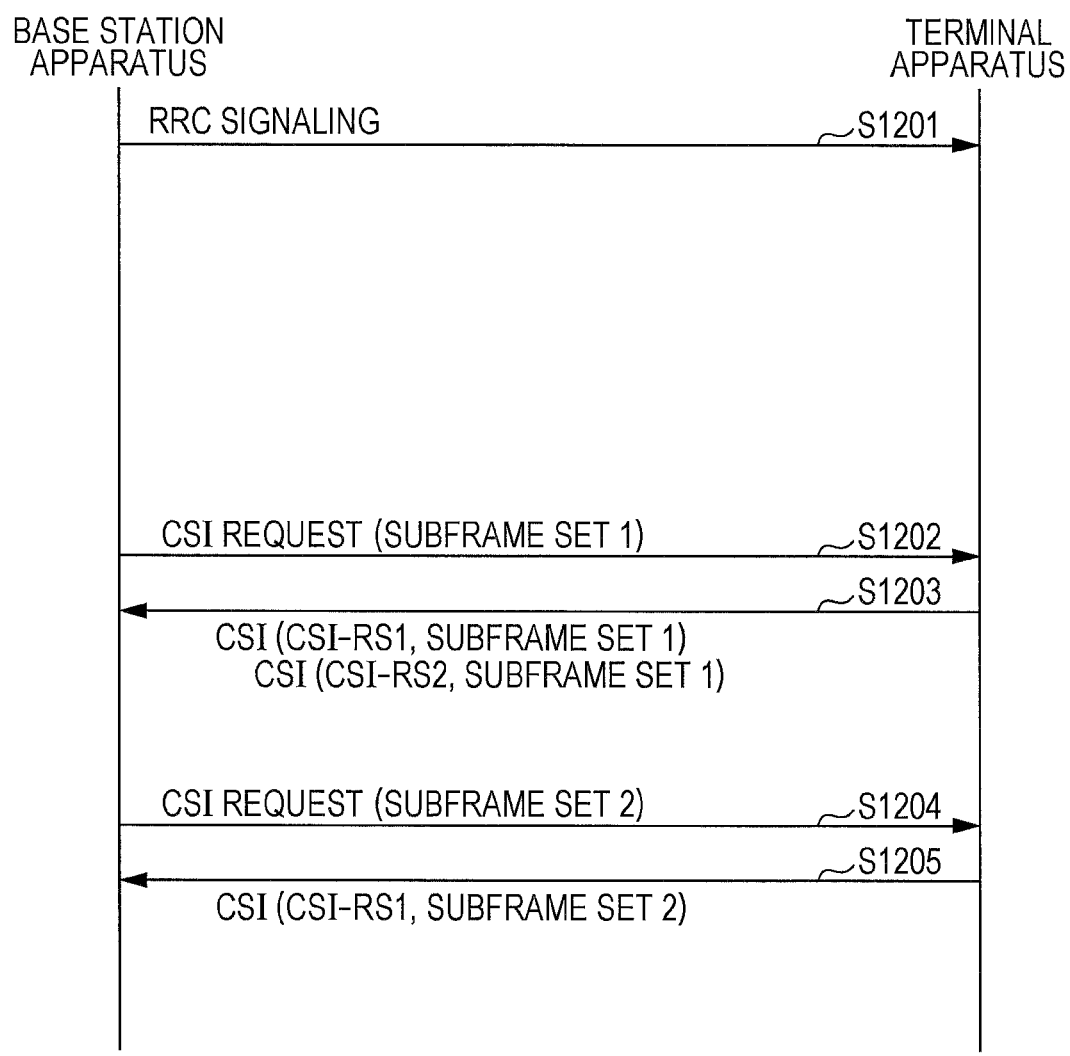
FIG. 12 is a diagram showing an example of a procedure for aperiodically performing feedback of CSI of a second embodiment.

FIG. 12 is an example of a procedure for aperiodic feedback of CSI according to the embodiment. First, the base station apparatus configures parameters of the feedback of the terminal apparatus through the RRC signaling (Step S1201). The parameters can include combination (channel state information reference signal configuration information) of the DLRSs for reporting the CSI. That is, it is possible to use a parameter for indicating which DLRS is referred to when calculating the CSI aperiodically reported. For example, in a case where the n (n is a natural number) kinds of CSI-RS1 are configured, the parameter can be expressed by bit map with n bits. In addition, as the parameter, the aperiodic feedback mode can be configured with respect to each combination of the plurality of DLRSs and the subframe set 1. The aperiodic feedback mode is regulated by the combination of the content to be reported.

Next, the base station apparatus notifies a CSI request which is information for indicating the aperiodic feedback to the terminal apparatus (Step S1202). In addition, the base station apparatus allocates resources (for example, a physical uplink shared channel) for simultaneously reporting the feedback information. Herein, in a case where the subframe set is configured, the subframe for transmitting the CSI request is a subframe included in any of the subframe sets. Herein, it is assumed the subframe for transmitting the CSI request is included in the subframe set 1. The terminal apparatus which is indicated the aperiodic feedback reports the CSI of each DLRS to the base station apparatus simultaneously (at the same timing), according to the feedback parameters (combination of DLRSs) configured in the Step S1201 (step S1203). In FIG. 12, since the example in which the combination of the CSI-RS1 and the CSI-RS2 is configured is shown, the terminal apparatus reports the CSI calculated by referring to the CSI-RS1 and the CSI calculated by referring to the CSI-RS2. In addition, as Step S1202, in a case where the CSI request is notified in the subframe included in the subframe set 1, the terminal apparatus calculates the CSI using an average value of the noise or the interference signal power of subframe set 1. Each of the CSI calculated by referring to each CSI-RS can include the content regulated by the aperiodic feedback mode which is individually configured, with respect to each combination of the plurality of DLRSs and the plurality of subframe sets.

In a case where the base station apparatus notifies the CSI request to the terminal apparatus using the subframe included in the subframe set 2 (Step S1204), the terminal apparatus which is indicated the aperiodic feedback reports only the CSI of the first DLRS to the base station apparatus (Step S1205).

Herein, the case where the combination of the DLRSs is commonly configured for the subframe sets, has been described, however, it is not limited thereto. The combination of DLRSs can be individually configured for each subframe set.

In addition, the case where the subframe sets are configured has been described, however, it is not limited thereto. In a case where the subframe sets are not configured, instead of the combinations of the plurality of DLRSs and the subframe set 1, the aperiodic feedback mode may be configured with respect to each of the plurality of DLRSs.

Figure 13:
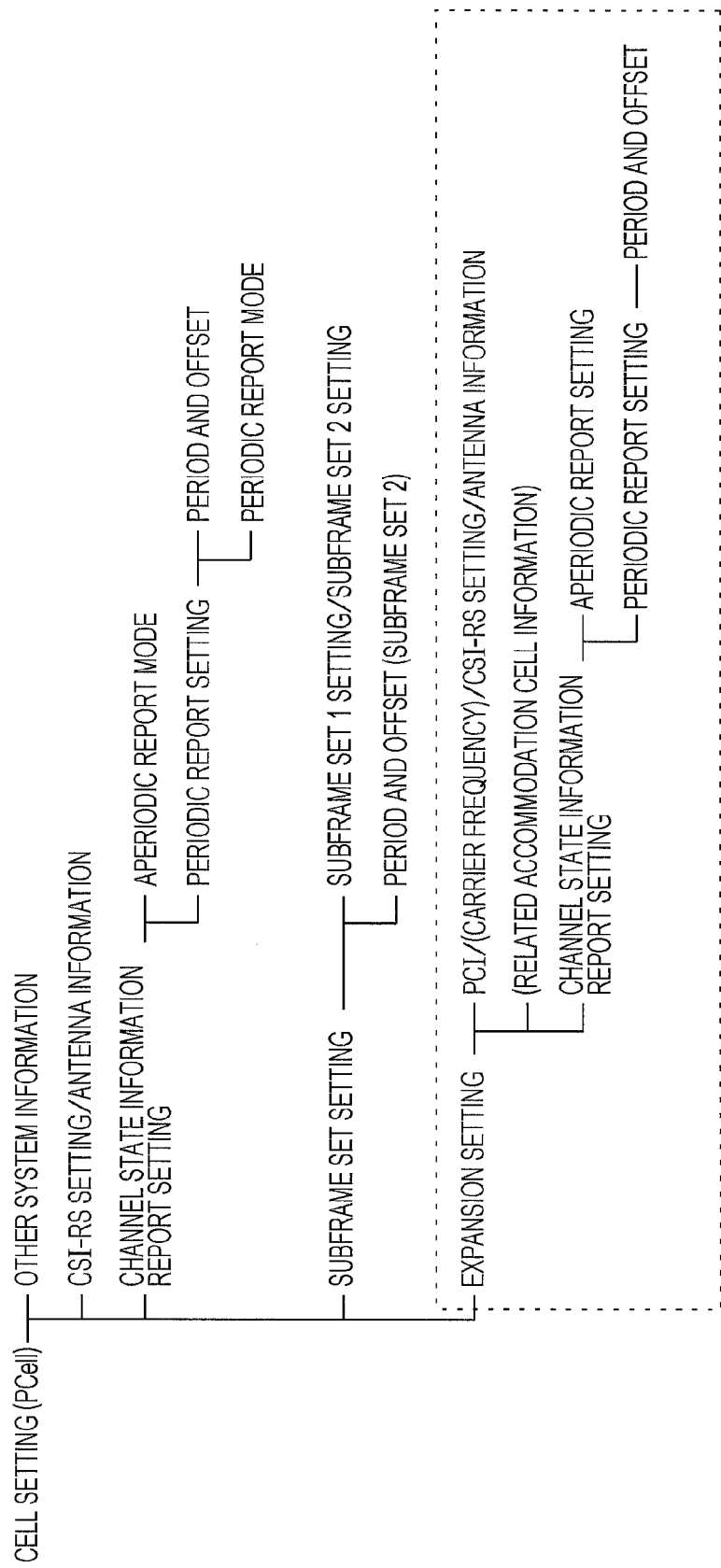
FIG. 13 is a diagram showing an example of a structure of an information element of RRC signaling of a second embodiment.

FIG. 13 is an example of a structure of an information element of the RRC signaling. The difference from the structure of the information element of the first embodiment is a point that, in the configuration of the channel state information report in the extended configuration, the period and the offset of the periodic feedback is only with the combination of the subframe set 1 and the second and subsequent CSI-RSs (simply second and subsequent CSI-RSs in a case where the subframe sets are not configured).

Using such information elements, the parameter setting through the RRC signaling of Step S1101 in FIG. 11 and Step S1201 in FIG. 12 can be realized. The signaling is performed between the higher layer 411 and the higher layer 506. In addition, under the instruction of the higher layer 506, the feedback information generating unit 507 generates each CSI at designated timing, and the uplink subframe generating unit 509 performs a multiplexing process at designated timing. On the other hand, the feedback information extracting unit 409 of the filter unit 408 in the base station apparatus acquires each CSI at designated timing, under the indication of the higher layer 411.

As described above, the base station apparatus notifies the plurality of CSI-RS configurations to the terminal apparatus, and the terminal apparatus performs the feedback of the CSI which is calculated by referring to each CSI-RS. At that time, each CSI-RS configuration includes information indicating individual CSI-RS position (for example, period and offset). In addition, the base station apparatus individually configures the following items (1) to (3), with respect to each CSI calculated by referring to each CSI-RS.

(1) Aperiodic Report Mode
(2) Periodic Report Mode
(3) Feedback Period and Offset of Periodic Report Feedback (Period and Offset of Periodic Report Feedback for Each Subframe Set 1 in Case Where Subframe Set is Configured)

In a case of performing the aperiodic feedback, the base station apparatus previously notifies the combination of the CSI-RS(s) for reporting the CSI by the aperiodic feedback, among the plurality of CSI-RSs to the terminal apparatus.

Accordingly, it is possible to improve a degree of freedom of the CSI feedback parameter configuration (feedback timing, content for feedback, referred subframe set, or the like) with respect to the plurality of CSI-RSs having different parameter configuration (transmission period, transmission power, the number of ports, or the like), and therefore it is possible to perform the efficient report of reception quality information.

<Third Embodiment>

In a third embodiment, a configuration of calculating the CSI corresponding to the second and subsequent CSI-RSs in a coordinated multiple point (CoMP) system will be described. Hereinafter, the third embodiment of the present invention will be described with reference to FIGS. 14 to 17. In addition, the base station apparatus and the terminal apparatus according to the embodiment can be realized with the same configuration as the configuration examples shown in FIG. 4 and FIG. 5, and thus the detailed descriptions thereof are not repeated.

Figure 14:
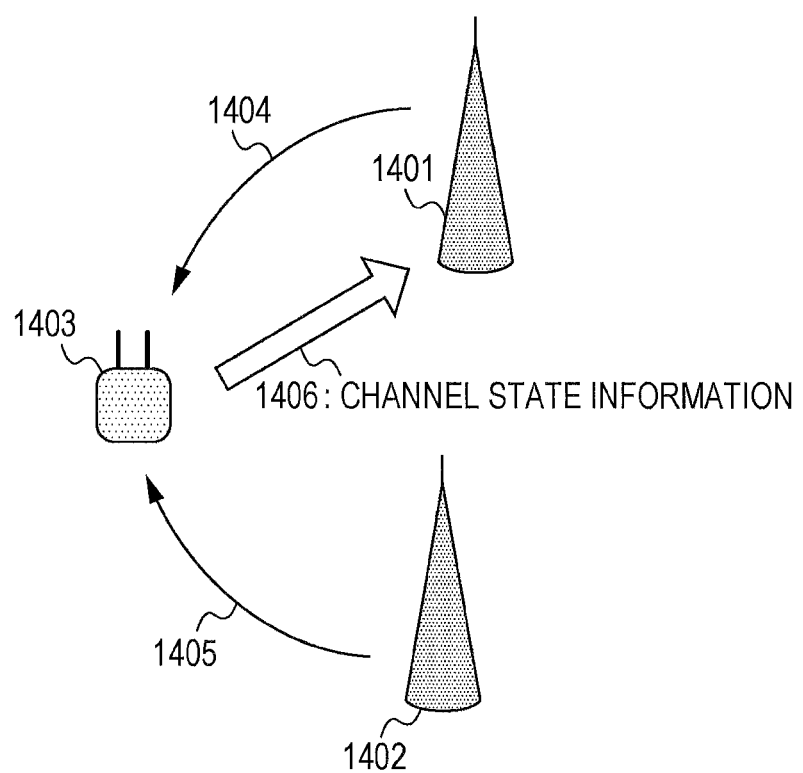
FIG. 14 is a schematic configuration diagram showing a configuration of a communication system according to a third embodiment of the present invention.

FIG. 14 is a schematic configuration diagram showing a configuration of a communication system according to the third embodiment of the present invention. The communication system of the drawing is assumed to be an LTE-A system, and includes a base station apparatus 1401 which configures cells, a cooperation base station apparatus (or cooperation transmission point) 1402, and a terminal apparatus 1403. In a case of adaptively controlling an MCS, rank, a precoder, or the like, with respect to downlink transmission signals which are transmitted from the base station apparatus 1401 and the cooperation base station apparatus 1402, the terminal apparatus 1403 refers a DLRS 1404 included in the downlink transmission signal transmitted from the base station apparatus 1401 and a DLRS 1405 included in the downlink transmission signal transmitted from the cooperation base station apparatus 1402, calculates CSI 1406 corresponding to each DLRS, and reports the CSI to the base station apparatus 1401 through the uplink channel.

Figure 15:
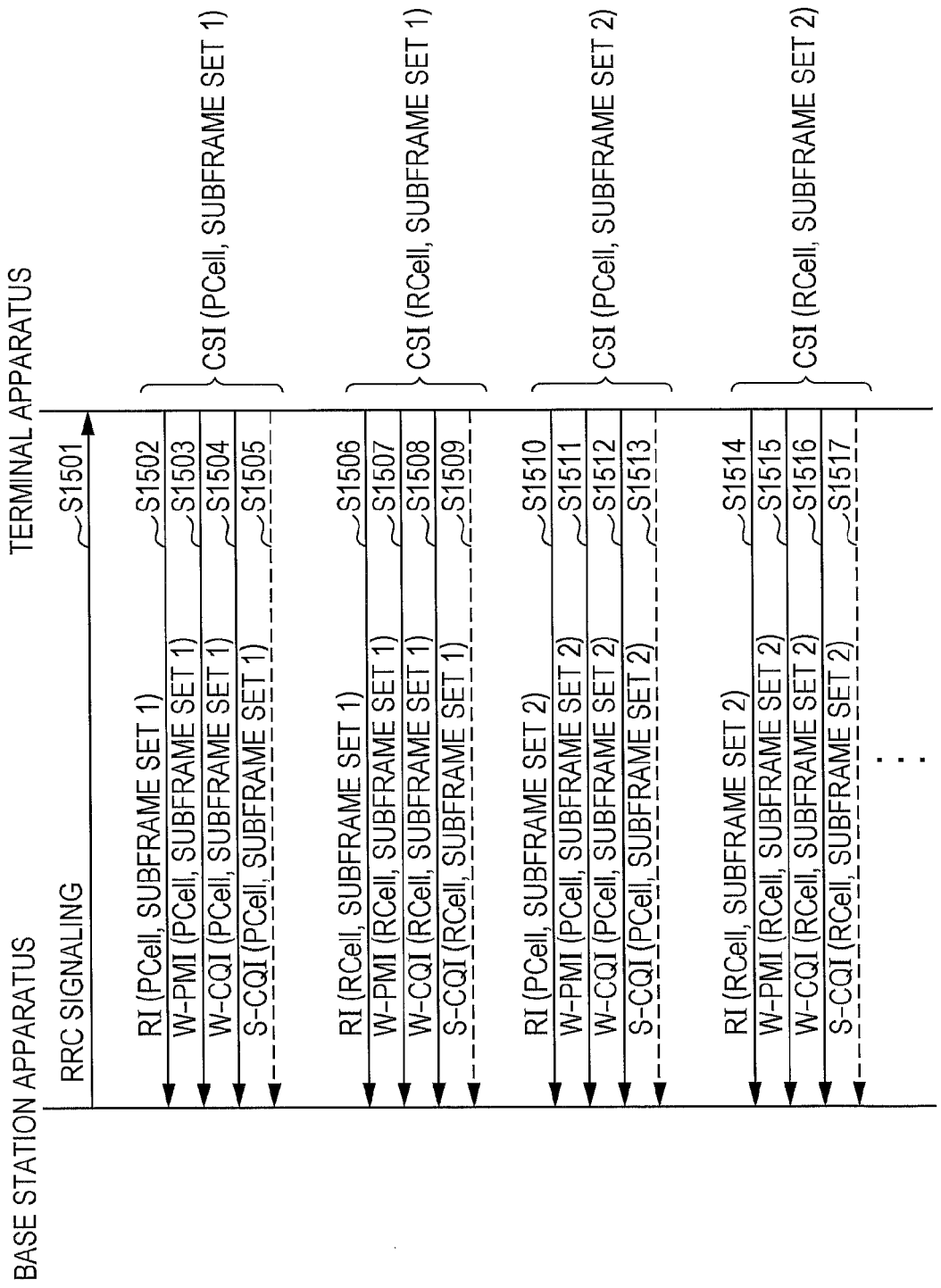
FIG. 15 is a diagram showing an example of a procedure for periodically performing feedback of CSI of a third embodiment.

FIG. 15 shows an example of a procedure of periodic CSI feedback according to the embodiment. The procedure in FIG. 15 is an example of a procedure for periodic feedback of the CSI.

First, through the RRC signaling, the base station apparatus configures the parameter of the feedback of the terminal apparatus and indicates the periodic feedback (Step S1501). As the parameter, the periodic feedback mode is configured with respect to each combination of the plurality of RCells (report cell, out-zone cell, cooperation cell, and report cell) and the plurality of subframe sets. Herein, the RCell is a cell other than the PCell and/or the SCell, and is a cell (CSI report cell) which is a target for calculating the CSI. The configuration of the periodic feedback mode at least includes configuration of the period and the offset. Herein, as the CSI report cell, two cells of PCell and RCell are assumed, and as the subframe sets, two subframe sets of the subframe set 1 and the subframe set 2 are assumed. Herein, the period is a period of the subframe, and corresponds to a period for feeding back each content included in the CSI. In addition, the offset is an offset of the subframe, and corresponds to an offset for shifting the timing for feeding back each content included in the CSI. The period and the offset may be separately configured with respect to each content, or may be implicitly associated between the content. For example, the periods and offsets of the RI and the W-CQI are separately configured, and the timing for reporting the W-PMI and S-CQI can be calculated from the period and the offset of the W-CQI.

The terminal apparatus which indicates the periodic feedback performs periodic CSI feedback described below, with respect to each combination of the plurality of CSI report cells and the plurality of subframe sets.

(1) The RI (Step S1502), the W-PMI (Step S1503), W-CQI (Step S1504), and S-CQI (Step S1505) are periodically reported to the base station apparatus, according to feedback parameters configured in the PCell and the subframe set 1.

(2) The RI (Step S1506), the W-PMI (Step S1507), W-CQI (Step S1508), and S-CQI (Step S1509) are periodically reported to the base station apparatus, according to feedback parameters configured in the RCell and the subframe set 1.

(3) The RI (Step S1510), the W-PMI (Step S1511), W-CQI (Step S1512), and S-CQI (Step S1513) are periodically reported to the base station apparatus, according to feedback parameters configured in the PCell and the subframe set 2.

(4) The RI (Step S1514), the W-PMI (Step S1515), W-CQI (Step S1516), and S-CQI (Step S1517) are periodically reported to the base station apparatus, according to feedback parameters configured in the RCell and the subframe set 2.

Figure 16:
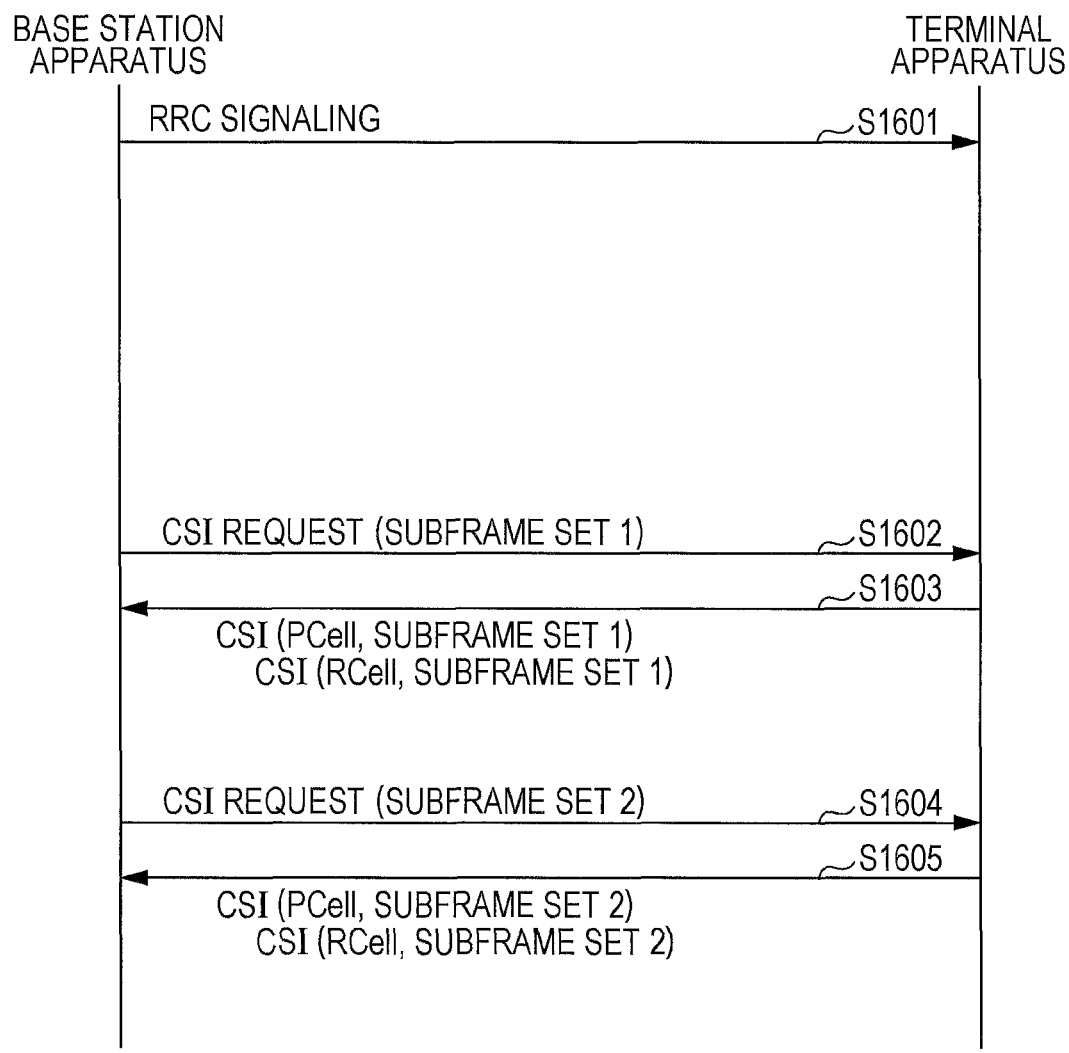
FIG. 16 is a diagram showing an example of a procedure for aperiodically performing feedback of CSI of a third embodiment.

FIG. 16 shows an example of a procedure for aperiodically performing feedback of CSI according to the embodiment. First, the base station apparatus configures parameters of the feedback of the terminal apparatus through the RRC signaling (Step S1601). The parameters can include combination (reference signal configuration information for channel state information measurement) of the CSI report cell for reporting the CSI. That is, it is possible to use a parameter for indicating that the CSI aperiodically reported is the CSI calculated by referring to DLRS of a specific CSI information report cell. For example, in a case where the n (n is a natural number) kinds of CSI report cells are configured, the parameter can be expressed by bit map with n bits. In addition, as the parameter, the aperiodic feedback mode can be configured with respect to each combination of the plurality of CSI report cells and the plurality of subframe sets. The aperiodic feedback mode is regulated by the combination of the content to be reported. Alternatively, the combination with the serving cells for report of the CSI may be configured and the reporting may be performed with the CSI of the RCell related to the serving cells included in the combination. Alternatively, the combination with the serving cells for report of the CSI and the combination of the RCell for report of the CSI may be separately configured, and the report of the CSI corresponding to the cell included in both combinations may be simultaneously performed. At that time, in a case where the m (m is a natural number) kinds of RCells are configured, the combination of the RCells (channel state information reference signal configuration information) can be expressed by bit map with m bits. Also, information indicating whether or not to simultaneously perform the feedback of the RCell in a case where the aperiodic feedback of the related serving cell is indicated, may be included in the configuration of the aperiodic feedback for each RCell.

Next, the base station apparatus notifies a CSI request which is information for indicating the aperiodic feedback to the terminal apparatus (Step S1602). In addition, the base station apparatus allocates resources (for example, a physical uplink shared channel) for simultaneously reporting the feedback information. Herein, in a case where the subframe set is configured, the subframe for transmitting the CSI request is a subframe included in any of the subframe sets. Herein, the subframe for transmitting the CSI request is included in the subframe set 1. The terminal apparatus which is indicated the aperiodic feedback reports the CSI of each CSI report cell to the base station apparatus simultaneously (at the same timing), according to the feedback parameters (combination of CSI report cells) configured in the Step S1601 (Step S1603). In FIG. 16, since the example in which the combination of the PCell as the CSI report cell and one RCell is configured is shown, the terminal apparatus reports the CSI calculated by referring to the PCell and the CSI calculated by referring to the one RCell. In addition, as Step S1602, in a case where the CSI request is notified in the subframe included in the subframe set 1, the terminal apparatus calculates the CSI using an average value of the noise or the interference signal power of subframe set 1. Each of the CSI calculated by referring to each CSI-RS of each CSI report cell can include the content regulated by the aperiodic feedback mode which is individually configured, with respect to each combination of the plurality of CSI report cells and the plurality of subframe sets.

Herein, the example in which the notification of the CSI request of the terminal apparatus in Step S1602 is performed with a dynamic signaling through the physical downlink control channel, is shown, however, it is not limited thereto. For example, the same effects can be obtained if the indication of the aperiodic feedback is performed by semi-static signaling through the RRC signaling. In this case, it is preferable to further indicate the subframe for reporting.

In a case where the base station apparatus notifies the CSI request to the terminal apparatus using the subframe included in the subframe set 2 (Step S1604), the terminal apparatus which is indicated the aperiodic feedback reports the CSI of each DLRS of each CSI report cell to the base station apparatus simultaneously (at the same timing) according to the parameters (combination of CSI report cells) of the feedback which is configured in Step S1601 (S1605). In FIG. 16, since the example in which the combination of the PCell and the one Rcell is configured is shown, the terminal apparatus reports the CSI calculated by referring to the PCell and the CSI calculated by referring to the one Rcell. In addition, as Step S1602, in a case where the CSI request is notified in the subframe included in the subframe set 2, the terminal apparatus calculates the CSI using an average value of the noise or the interference signal power of subframe set 2. Each of the CSI calculated by referring to each CSI-RS of each CSI report cell can include the content regulated by the aperiodic feedback mode which is individually configured, with respect to each combination of the plurality of CSI report cells and the plurality of subframe sets.

Herein, the case where the combination of the CSI report cells is commonly configured for the subframe sets, has been described, however, it is not limited thereto. The combination of CSI report cells can be individually configured for each subframe set. Alternatively, in the same manner as the second embodiment, the combination of the CSI report cells can be configured only with respect to the subframe set 1, and the report of the CSI only for the serving cell can be performed with respect to the subframe set 2.

In addition, the case where the subframe sets are configured has been described, however, it is not limited thereto. In a case where the subframe sets are not configured, instead of the combinations of the plurality of CSI report cells and the plurality of subframe sets, the aperiodic feedback mode may be configured with respect to each of the plurality of CSI report cells.

Figure 17:
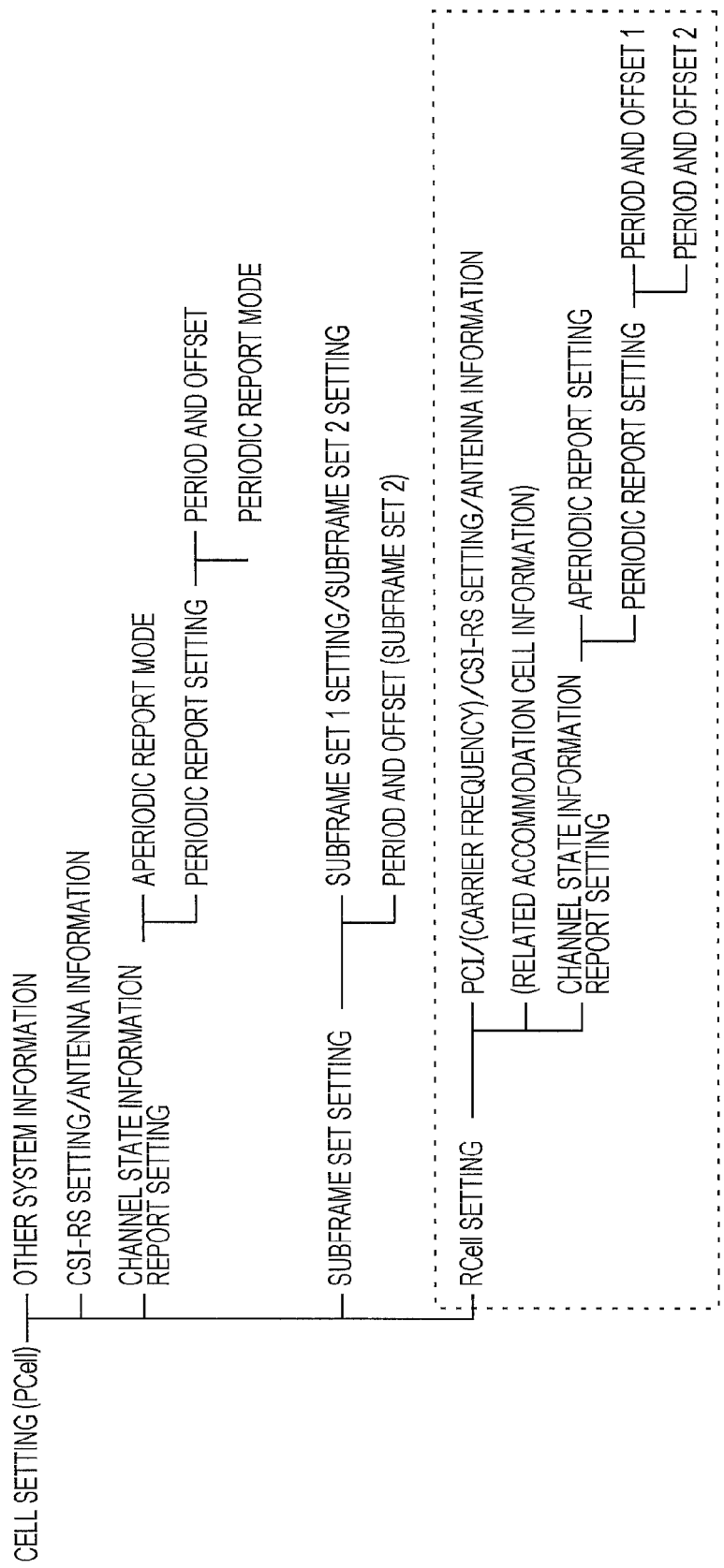
FIG. 17 is a diagram showing an example of a structure of an information element of RRC signaling of a third embodiment.

FIG. 17 is an example of a structure of an information element of the RRC signaling. The difference from the structure of the information element of the first embodiment is a point that, the extended configuration is RCell configuration.

The elements of the channel state information report configuration of the RCell configuration include an element of aperiodic report configuration which is configuration of the aperiodic CSI feedback related to CSI-RS of each RCell, and an element of periodic report configuration which is configuration of the periodic CSI feedback related to CSI-RS of each RCell. In addition, the element of periodic report configuration includes an element of the period and the offset (period and offset 1) indicating timing of the periodic feedback of the subframe set 1 in a case where the subframe sets are configured or in a case where the subframe sets are not configured, and an element of the period and the offset (period and offset 2) indicating timing of the periodic feedback of the subframe set 2 in a case where the subframe sets are configured.

Using such information elements, the parameter configuration through the RRC signaling of Step S1501 in FIG. 15 and Step S1601 in FIG. 16 can be realized. The signaling is performed between the higher layer 411 and the higher layer 506. In addition, under the instruction of the higher layer 506, the feedback information generating unit 507 generates each CSI at designated timing, and the uplink subframe generating unit 509 performs a multiplexing process at designated timing. On the other hand, the feedback information extracting unit 409 of the filter unit 408 in the base station apparatus acquires each CSI at designated timing, under the instruction of the higher layer 411.

As described above, the base station apparatus notifies one or more kinds of RCell configurations to the terminal apparatus, and the terminal apparatus performs the feedback of the CSI which is calculated by referring to CSI-RS of PCell, SCell, or RCell, respectively. At that time, each RCell configuration includes information indicating individual CSI-RS position (for example, period and offset). In addition, the base station apparatus individually configures the following items (1) to (3), with respect to each CSI calculated by referring to CSI-RS of PCell, SCell, or RCell, respectively.

(1) Aperiodic Report Mode
(2) Periodic Report Mode
(3) Timing of Periodic Report Feedback, That is, Feedback Period and Offset (Period and Offset of Periodic Report Feedback for Each Subframe Set in Case Where Subframe Set is Configured)

In a case of performing the aperiodic feedback, the base station apparatus previously notifies the combination of the CSI report cell for reporting the CSI by the aperiodic feedback, among the plurality of CSI report cells to the terminal apparatus.

Accordingly, it is possible to improve a degree of freedom of the CSI feedback parameter configuration (feedback timing, content for feedback, referred subframe set, or the like) with respect to the plurality of CSI report cells having different parameter configuration (transmission period, transmission power, the number of ports, or the like), and therefore it is possible to perform the efficient report of reception quality information.

<Fourth Embodiment>

In a fourth embodiment, a configuration of calculating the CSI corresponding to the CSI-RS of the second and subsequent bands in a system using a carrier segment will be described. Hereinafter, the fourth embodiment of the present invention will be described with reference to FIGS. 18 to 20. In addition, the base station apparatus and the terminal apparatus according to the embodiment can be realized with the same configuration as the configuration examples shown in FIG. 4 and FIG. 5, and thus the detailed descriptions thereof are not repeated.

Figure 18:
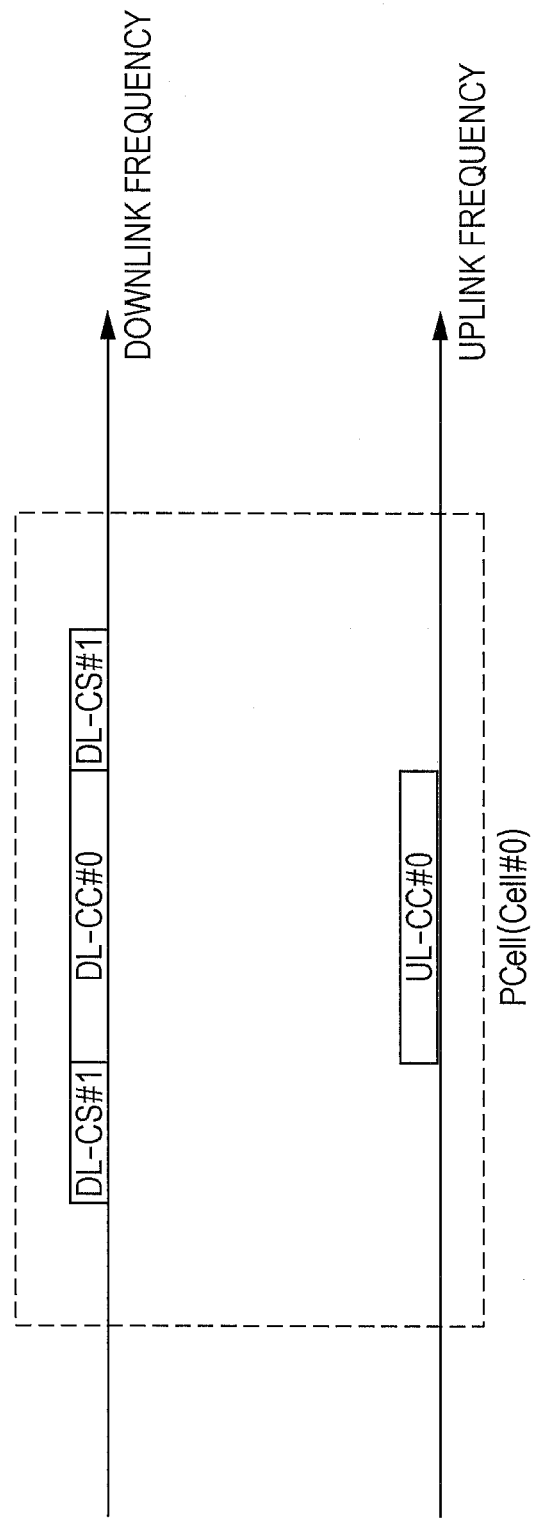
FIG. 18 is a schematic configuration diagram showing a configuration of CC according to a fourth embodiment of the present invention.

FIG. 18 is a schematic configuration diagram showing a configuration of CC according to the fourth embodiment of the present invention. The system band of the downlink includes carrier segments DL-CS#1 which are expanded band, in addition to DL-CC#0 which is the CC used in the normal communication. All of DL-CC#0 and/or DL-CS#1 are the band of PCell.

Figure 19:
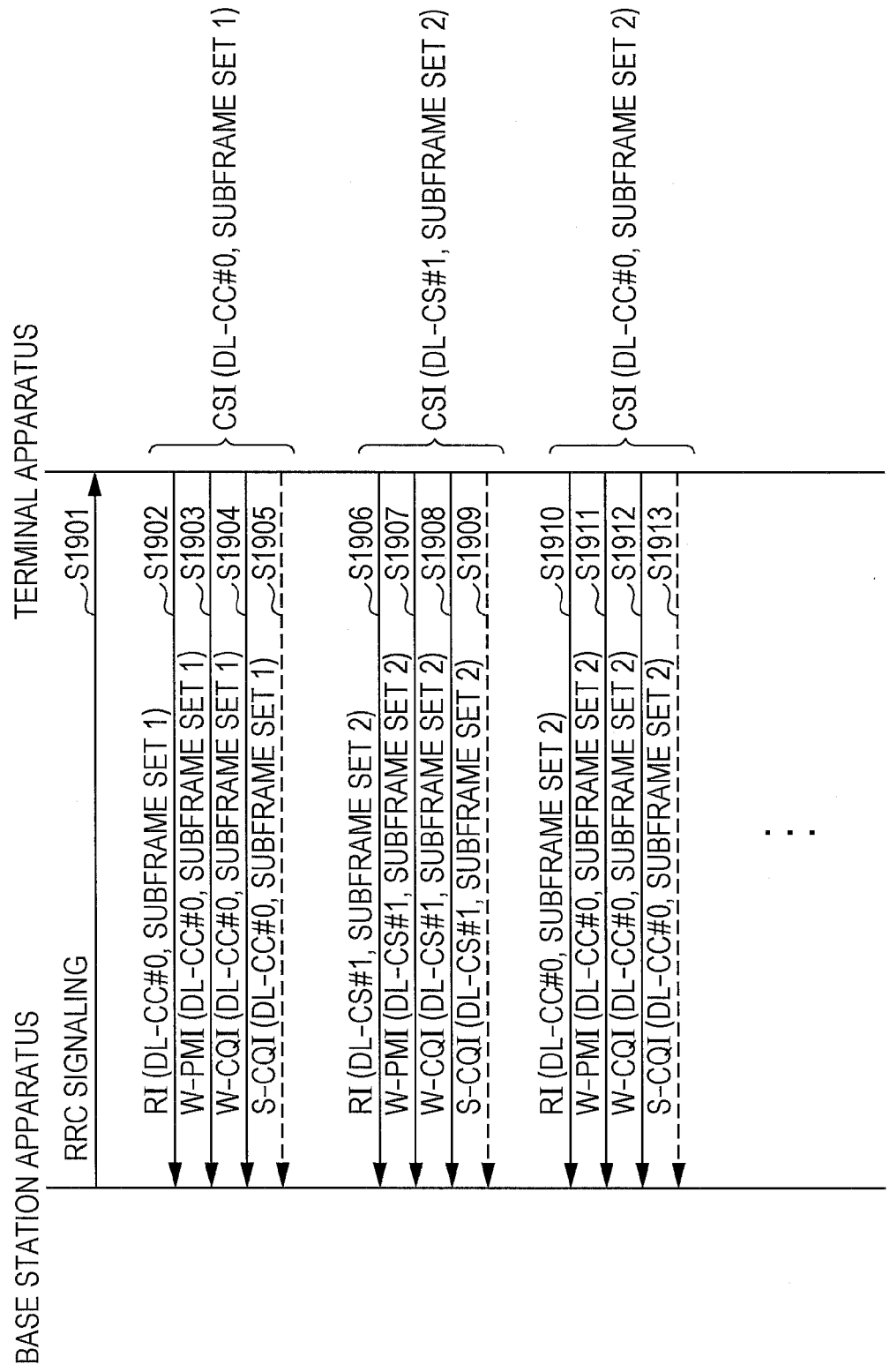
FIG. 19 is a diagram showing an example of a procedure for periodically performing feedback of CSI of a fourth embodiment.

FIG. 19 shows an example of a procedure of periodic CSI feedback according to the embodiment. The procedure in FIG. 19 is an example of a procedure for periodic feedback of the CSI.

First, through the RRC signaling, the base station apparatus configures the parameter of the feedback of the terminal apparatus and indicates the periodic feedback (Step S1901). As the parameter, the periodic feedback mode is configured with respect to each combination of the plurality of bands (CC and carrier segment) and the plurality of subframe sets. Herein, the CC and the carrier segment which are report targets of the CSI are called a "CSI report band". The configuration of the periodic feedback mode includes, at least, configuration of a period and an offset. Herein, as the CSI report band, two bands of the DL-CC#0 and DL-CS#1 are assumed, and as the subframe sets, two subframe sets of the subframe set 1 and the subframe set 2 are assumed. Herein, the period is a period of the subframe, and corresponds to a period for feeding back each content included in the CSI. In addition, the offset is an offset of the subframe, and corresponds to an offset for shifting the timing for feeding back each content included in the CSI. The period and the offset may be separately configured with respect to each content, or may be implicitly associated between the content. For example, the periods and offsets of the RI and the W-CQI are separately configured, and the timing for reporting the W-PMI and S-CQI can be calculated from the period and the offset of the W-CQI.

The terminal apparatus which indicates the periodic feedback performs periodic CSI feedback described below, with respect to each combination of the plurality of CSI report bands and the plurality of subframe sets.

(1) The RI (Step S1902), the W-PMI (Step S1903), W-CQI (Step S1904), and S-CQI (Step S1905) are periodically reported to the base station apparatus, according to feedback parameters configured in the DL-CC#0 and the subframe set 1.

(2) The RI (Step S1906), the W-PMI (Step S1907), W-CQI (Step S1908), and S-CQI (Step S1909) are periodically reported to the base station apparatus, according to feedback parameters configured in the DL-CC#0 and the subframe set 2.

(3) The RI (Step S1910), the W-PMI (Step S1911), W-CQI (Step S1912), and S-CQI (Step S1913) are periodically reported to the base station apparatus, according to feedback parameters configured in the DL-CS#1 and the subframe set 2.

Herein, the example of performing the feedback only with the subframe set 2 for the carrier segment is shown, however, the feedback may be performed with other combinations (for example, DL-CS#1 and the subframe set 1).

Figure 20:
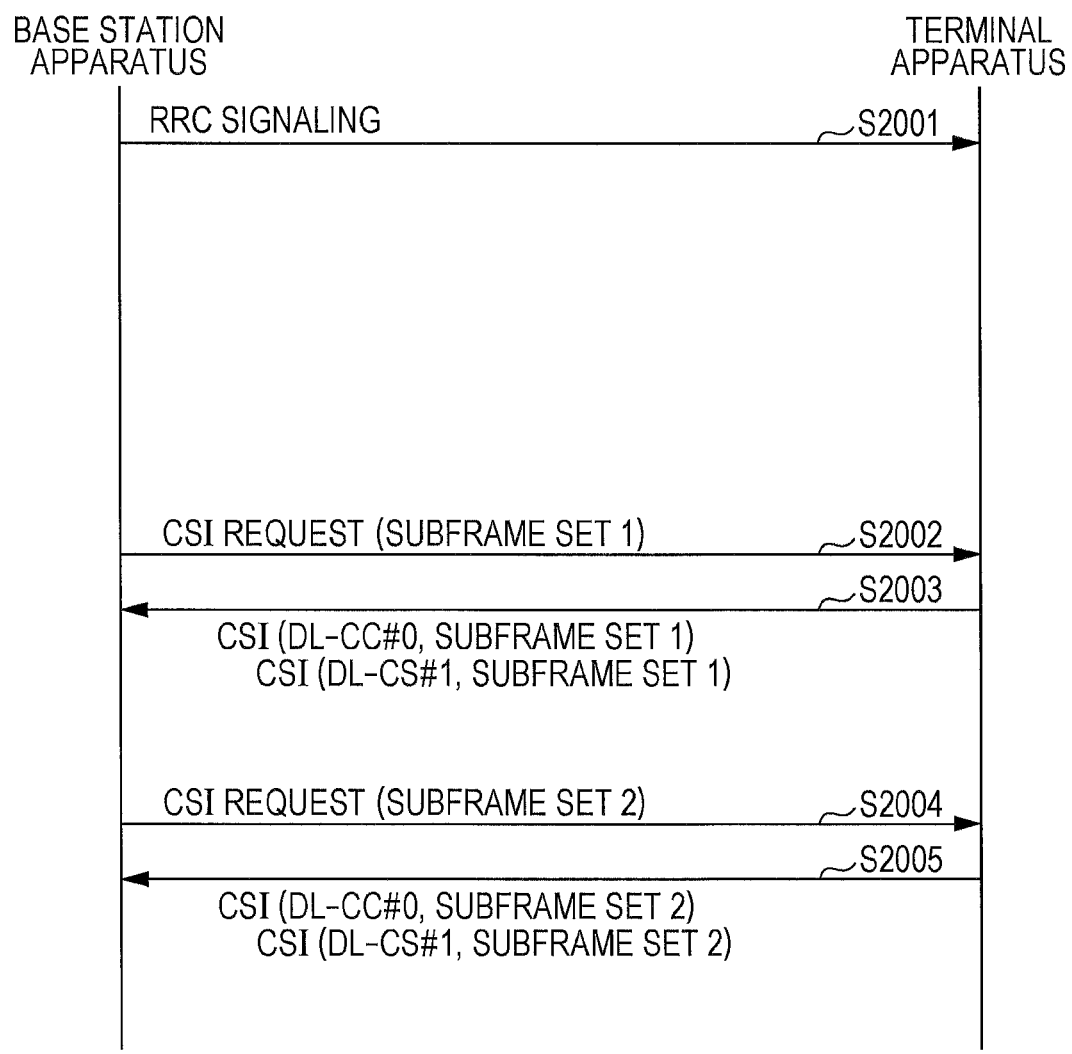
FIG. 20 is a diagram showing an example of a procedure for aperiodically performing feedback of CSI of a fourth embodiment.
Figure 21:
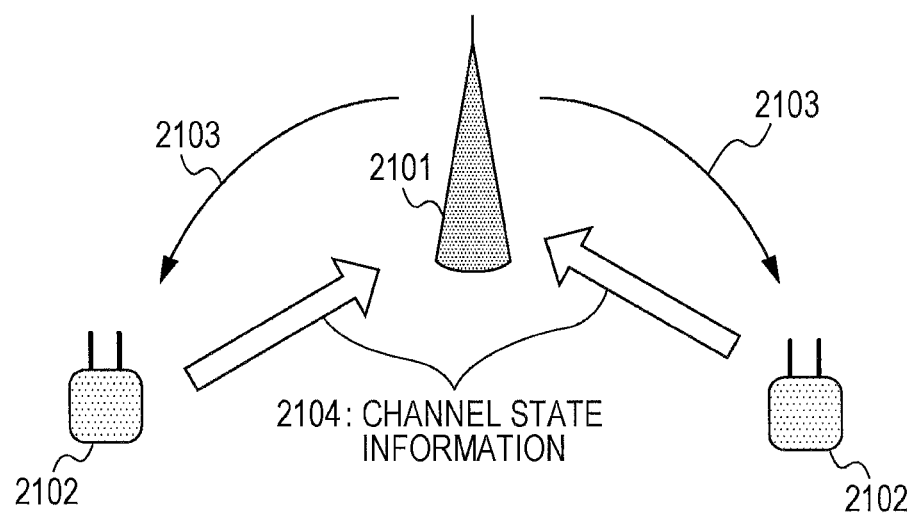
FIG. 21 is a schematic configuration diagram showing a configuration example of a communication system.

FIG. 20 shows an example of a procedure for aperiodically performing feedback of CSI according to the embodiment. First, the base station apparatus configures parameters of the feedback of the terminal apparatus through the RRC signaling (Step S2001). The parameters can include combination (channel state information reference signal configuration information) of the CSI report band for reporting the CSI. That is, it is possible to use a parameter for indicating that the CSI aperiodically reported is the CSI calculated by referring to DLRS of a specific CSI information report band. For example, in a case where the n (n is a natural number) kinds of CSI report bands are configured, the parameter can be expressed by bit map with n bits. In addition, as the parameter, the aperiodic feedback mode can be configured with respect to each combination of the plurality of CSI report bands and the plurality of subframe sets. The aperiodic feedback mode is regulated by the combination of the content to be reported. Alternatively, the combination with the serving cells for report of the CSI may be configured and the reporting may be performed with the CSI of the carrier segment related to the serving cells included in the combination. Alternatively, the combination with the serving cells for report of the CSI and the combination of the carrier segment for report of the CSI may be separately configured, and the report of the CSI corresponding to the cell included in both combinations may be simultaneously performed. At that time, in a case where the m (m is a natural number) kinds of carrier segments are configured, the combination of the carrier segments (channel state information reference signal configuration information) can be expressed by bit map with m bits.

Next, the base station apparatus notifies a CSI request which is information for indicating the aperiodic feedback to the terminal apparatus (Step S2002). In addition, the base station apparatus allocates resources (for example, a physical uplink shared channel) for simultaneously reporting the feedback information. Herein, in a case where the subframe set is configured, the subframe for transmitting the CSI request is a subframe included in any of the subframe sets. Herein, the subframe for transmitting the CSI request is included in the subframe set 1. The terminal apparatus which is indicated the aperiodic feedback reports the CSI of each CSI report band to the base station apparatus simultaneously (at the same timing), according to the feedback parameters (combination of CSI report bands) configured in the Step S2001 (Step S2003). In FIG. 20, since the example in which the combination of the DL-CC#0 as the CSI report cell and DL-CS#1 is configured is shown, the terminal apparatus reports the CSI calculated by referring to the DL-CC#0 and the CSI calculated by referring to the DL-CS#1. In addition, as Step S2002, in a case where the CSI request is notified in the subframe included in the subframe set 1, the terminal apparatus calculates the CSI using an average value of the noise or the interference signal power of subframe set 1. Each of the CSI calculated by referring to each CSI-RS of each CSI report band can include the content regulated by the aperiodic feedback mode which is individually configured, with respect to each combination of the plurality of CSI report bands and the plurality of subframe sets.

Herein, the example in which the notification of the CSI request of the terminal apparatus in Step S2002 is performed with a dynamic signaling through the physical downlink control channel, is shown, however, it is not limited thereto. For example, the same effects can be obtained if the indication of the aperiodic feedback is performed by semi-static signaling through the RRC signaling. In this case, it is preferable to further indicate the subframe for reporting.

In a case where the base station apparatus notifies the CSI request to the terminal apparatus using the subframe included in the subframe set 2 (Step S2004), the terminal apparatus which is indicated the aperiodic feedback reports the CSI of each DLRS of each CSI report band to the base station apparatus simultaneously (at the same timing) according to the parameters (combination of CSI report cells) of the feedback which is configured in Step S2001 (S2005). In FIG. 20, since the example in which the combination of the DL-CC#0 and the DL-CS#1 is configured is shown, the terminal apparatus reports the CSI calculated by referring to the DL-CC#0 and the CSI calculated by referring to the DL-CS#1. In addition, as Step S2002, in a case where the CSI request is notified in the subframe included in the subframe set 2, the terminal apparatus calculates the CSI using an average value of the noise or the interference signal power of subframe set 2. Each of the CSI calculated by referring to each CSI-RS of each CSI report band can include the content regulated by the aperiodic feedback mode which is individually configured, with respect to each combination of the plurality of CSI report bands and the plurality of subframe sets.

Herein, the case where the combination of the CSI report bands are commonly configured for the subframe sets has been described, however, it is not limited thereto. The combination with CSI report cells can be individually configured for each subframe set.

In addition, the case where the subframe sets are configured has been described, however, it is not limited thereto. In a case where the subframe sets are not configured, instead of the combinations of the plurality of CSI report bands and the plurality of subframe sets, the aperiodic feedback mode may be configured with respect to each of the plurality of CSI report bands.

The structure of the information elements of the RRC signaling can refer to a configuration obtained by changing the RCell to the carrier segment in the configuration of the information elements of the third embodiment, and therefore the detailed descriptions thereof are not repeated.

As described above, the base station apparatus notifies one or more kinds of carrier segment configurations to the terminal apparatus, and the terminal apparatus performs the feedback of the CSI which is calculated by referring to CSI-RS of CC of PCell and/or SCell or carrier segment. At that time, each carrier segment configuration includes information indicating individual CSI-RS position (for example, period and offset). In addition, the base station apparatus individually configures the following items (1) to (3), with respect to each CSI calculated by referring to CSI-RS of CC of PCell and/or SCell or carrier segment.

(1) Aperiodic Report Mode
(2) Periodic Report Mode
(3) Feedback Period and Offset of Periodic Report Feedback (Period and Offset of Periodic Report Feedback for Each Subframe Set in Case Where Subframe Set is Configured)

In a case of performing the aperiodic feedback, the base station apparatus previously notifies the combination of the CSI report band for reporting the CSI by the aperiodic feedback, among the plurality of CSI report bands to the terminal apparatus.

Accordingly, it is possible to improve a degree of freedom of the CSI feedback parameter configuration (feedback timing, content for feedback, referred subframe set, or the like) with respect to the plurality of CSI report bands having different parameter configuration (transmission period, transmission power, the number of ports, or the like), and therefore it is possible to perform the efficient report of reception quality information.

In addition, in the embodiment, the case of performing individual CSI-RS configuration with respect to the CC and carrier segment in one serving cell has been described, however, it is not limited thereto. For example, the CSI-RS position (period and offset) can be commonly configured. Also in this case, the aperiodic report mode and/or the periodic report mode may be individually configured.

<Other Embodiment>

The programs for realizing all or a part of functions of the base station apparatus and/or all or a part of functions of the terminal apparatus are recorded to a computer-readable recording medium, the programs recorded in this recording medium are put in a computer system and executed, and therefore the process of each unit may be performed. The "computer system" herein includes an OS or hardware of a peripheral device.

The "computer system" also includes a homepage providing environment (or display environment), in a case of using a WWW system.

The "computer-readable recording medium" includes a portable medium such as a flexible disk, a magneto optical disk, a ROM, or a CD-ROM, a recording device such as a hard disk embedded in the computer system, or the like. The "computer-readable recording medium" includes a medium which dynamically holds the programs for a short time, as a communication line in a case of transmitting the program through a network such as Internet or a communication line such as a phone line, and a medium which holds the program for the given time, as a volatile memory in the computer system which becomes a server or a client in each case. In addition, the program may be a program for realizing the part of the functions, or may be a program which can be realized by combining with a program in which the functions described above are already recorded in the computer system.

All or a part of the base station apparatus and/or all or a part of the terminal apparatus may be realized by aggregating to each integrated circuit. Each function block of the base station apparatus and the terminal apparatus may individually become a chip or become a chip by integrating a part or all thereof. In addition, the method of setting the integrated circuit may be realized by a dedicated circuit or a general-purpose processor, without being limited to large scale integration (LSI). In a case of finding a technology of setting the integrated circuit substituted for the LSI with the advancement of the semiconductor technology, an integrated circuit according to the technology can be used.

Hereinabove, the embodiments of the present invention have been described with reference to the drawings, however, the detailed configuration is not limited to the embodiments, and also includes design changes in a range not departing from the scope of the present invention. In the present invention, various changes can be performed in a range shown in the claims, and the embodiments obtained by appropriately combining technical means disclosed in each different embodiment are also included in the technical scope of the present invention. In addition, the technical scope also includes the configuration in which the elements which are described in each embodiment and exhibit the same effects are substituted for each other.

Reference Signs List 101, 1401, 2101 Base station apparatus
102, 1403, 2102 Terminal apparatus
401 Downlink subframe generating unit
402 Physical downlink control channel generating unit
403 Downlink reference signal generating unit
404, 511 Signal transmitting unit
405, 512 Transmit antenna
406, 501 Receive antenna
407, 502 Signal receiving unit
408 Filter unit
409 Feedback information extracting unit
410 Codeword processing unit
411, 506 Higher layer
503 Downlink subframe processing unit
504 Downlink reference signal extracting unit
505 Physical downlink control channel extracting unit
507 Feedback information generating unit
508 Codeword generating unit
509 Uplink subframe generating unit
510 Feedback information multiplexing unit
1402 Cooperation base station apparatus
2103 Downlink transmission signal
2104 Reception quality information

The invention claimed is:

1. A terminal apparatus which communicates with a base station apparatus, the terminal apparatus comprising:
a higher layer processor configured and/or programmed to acquire a Radio Resource Control (RRC) message;
a receiver configured to receive a physical downlink control channel including a channel state information request; and
an uplink transmitter configured to transmit, at one subframe, feedback information that includes a plurality of channel state information (CSI), wherein
the RRC message includes information indicating a configuration of a primary cell,
the information indicating the configuration of the primary cell includes a configuration information and a plurality of information elements, the configuration information indicating one or more subframe set(s) and the plurality of information elements being related to channel state information (CSI),
each of the plurality of information elements includes information indicating a downlink reference signal (CSI-RS),
each of the plurality of channel state information is channel state information of a subframe set among the one or more subframe set(s), the subframe set including a subframe that includes the physical downlink control channel including the channel state information request,
each of the plurality of channel state information is calculated referring to the downlink reference signal that is indicated by the information included in one of the plurality of information elements, and
each of the plurality of information elements includes information indicating an aperiodic CSI feedback mode, and
the aperiodic feedback mode regulates corresponding one of the plurality of the channel state information.

2. A base station which communicates with a terminal apparatus, the base station apparatus comprising:
a higher layer processor configured and/or programmed to notify a Radio Resource Control (RRC) message;
a downlink transmitter configured to transmit a physical downlink control channel including a channel state information request; and
an uplink receiver configured to receive, at one subframe, feedback information that includes a plurality of channel state information (CSI), wherein
the RRC message includes information indicating a configuration of a primary cell,
the information indicating the configuration of the primary cell includes a configuration information and a plurality of information elements, the configuration information indicating one or more subframe set(s), and the plurality of information elements being related to channel state information (CSI),
each of the plurality of information elements includes information indicating a downlink reference signal (CSI-RS),
each of the plurality of channel state information is channel state information of a subframe set among the one or more subframe set(s), the subframe set including a subframe that includes the physical downlink control channel including the channel state information request,
each of the plurality of channel state information is calculated referring to the downlink reference signal that is indicated by the information included in oneof the plurality of information elements, and
each of the plurality of information elements includes information indicating an aperiodic CSI feedback mode, and
the aperiodic feedback mode regulates corresponding one of the plurality of the channel state information.

3. A communication method used in a terminal apparatus which communicates with a base station apparatus, the communication method comprising:
a step of acquiring a Radio Resource Control (RRC) message;
a step of receiving a physical downlink control channel including a channel state information request; and
a step of transmitting, at one subframe, feedback information that includes a plurality of channel state information (CSI), wherein
the RRC message includes information indicating a configuration of a primary cell, the information indicating the configuration of the primary cell includes a configuration information and a plurality of information elements, the configuration information indicating one or more subframe set(s) and the plurality of information elements being related to channel state information (CSI), each of the plurality of information elements includes information indicating a downlink reference signal (CSI-RS), each of the plurality of channel state information is channel state information of a subframe set among the one or more subframe set(s), the subframe set=including a subframe that includes the physical downlink control channel including the channel state information request, each of the plurality of channel state information is calculated referring to the downlink reference signal that is indicated by the information included in one of the plurality of information elements, and each of the plurality of information elements includes information indicating an aperiodic CSI feedback mode, and the aperiodic feedback mode regulates corresponding one of the plurality of the channel state information.

4. A communication method used in a base station which communicates with a terminal apparatus, the communication method comprising:

a step of notifying a Radio Resource Control (RRC) message;

a step of transmitting a physical downlink control channel including a channel state information request; and a step of receiving, at one subframe, feedback information that includes a plurality of channel state information (CSI), wherein the RRC message includes information indicating a configuration of a primary cell, the information indicating the configuration of the primary cell includes a configuration information and a plurality of information elements, the configuration information indicating one or more subframe set(s), and the plurality of information elements being related to channel state information (CSI), each of the plurality of information elements includes information indicating a downlink reference signal (CSI-RS), each of the plurality of channel state information is channel state information of a subframe set among the one or more subframe set(s), the subframe set including a subframe that includes the physical downlink control channel including the channel state information request, each of the plurality of channel state information is calculated referring to the downlink reference signal that is indicated by the information included in one of the plurality of information elements, and each of the plurality of information elements includes information indicating an aperiodic CSI feedback mode, and the aperiodic feedback mode regulates corresponding one of the plurality of the channel state information.

* * * * *